(12) United States Patent
Mesaros

(10) Patent No.: US 8,306,870 B2
(45) Date of Patent: *Nov. 6, 2012

(54) ORDER AGGREGATION AND MERCHANT RANKING

(75) Inventor: Gregory J. Mesaros, Tampa, FL (US)

(73) Assignee: eWinWin, Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/106,622

(22) Filed: May 12, 2011

(65) Prior Publication Data

US 2011/0213650 A1 Sep. 1, 2011

Related U.S. Application Data

(63) Continuation of application No. 09/922,884, filed on Aug. 6, 2001, which is a continuation-in-part of application No. 09/324,391, filed on Jun. 3, 1999, now abandoned, said application No. 09/922,884 is a continuation-in-part of application No. 09/426,063, and a continuation-in-part of application No. PCT/US00/11989, filed on May 3, 2000, now Pat. No. 7,818,212, which is a continuation of application No. 09/342,345, filed on Jun. 29, 1999, now abandoned, and a continuation of application No. 09/324,391, filed on Jun. 3, 1999, now abandoned, and a continuation of application No. 09/426,063, filed on Oct. 22, 1999, now Pat. No. 7,818,212.

(60) Provisional application No. 60/133,769, filed on May 12, 1999.

(51) Int. Cl.
*G06Q 30/00* (2006.01)

(52) U.S. Cl. ............... 705/26.41; 705/14.23; 705/14.51

(58) Field of Classification Search ................ 705/26.1, 705/26.41, 14.23, 14.51
See application file for complete search history.

(56) References Cited

U.S. PATENT DOCUMENTS

| 4,789,928 | A | 12/1988 | Fujisaki |
| 4,799,156 | A | 1/1989 | Shavit et al. |
| 4,887,207 | A | 12/1989 | Natarajan |
| 4,947,028 | A | 8/1990 | Gorog |
| 4,992,940 | A | 2/1991 | Dworkin |
| 5,053,956 | A | 10/1991 | Donald et al. |

(Continued)

FOREIGN PATENT DOCUMENTS

EP 2000/50970 A2 8/2000

(Continued)

OTHER PUBLICATIONS

OA dated Nov. 27, 2009 for U.S. Appl. No. 11/680,431, 43 pages.

(Continued)

*Primary Examiner* — Marl Fadok
(74) *Attorney, Agent, or Firm* — Lewis and Roca LLP

(57) ABSTRACT

A system and method that facilitates e-commerce volume pricing is provided. According to one aspect of the present invention, the system includes an offers and orders component that receives and aggregates orders for a product from a plurality of buyers. The system also includes a logistics component that determines a shipping price for the product for a subset of the plurality of buyers. The shipping price is determined at least in part upon the subset of buyers sharing a shipping method. According to another aspect of the present invention, a method is provided in which buyers within an aggregated purchasing group may be subject to different pricing structures for the same product.

32 Claims, 15 Drawing Sheets

U.S. PATENT DOCUMENTS

| | | |
|---|---|---|
| 5,053,957 A | 10/1991 | Suzuki |
| 5,063,506 A | 11/1991 | Brockwell et al. |
| 5,402,336 A | 3/1995 | Spiegelhoff et al. |
| 5,414,838 A | 5/1995 | Kolton et al. |
| 5,444,630 A | 8/1995 | Dlugos |
| 5,564,115 A | 10/1996 | Clarkson |
| 5,592,375 A | 1/1997 | Salmon et al. |
| 5,615,109 A | 3/1997 | Eder |
| 5,623,660 A | 4/1997 | Josephson |
| 5,664,115 A | 9/1997 | Fraser |
| 5,689,652 A | 11/1997 | Lupien et al. |
| 5,710,887 A | 1/1998 | Chelliah et al. |
| 5,717,989 A | 2/1998 | Tozzoli et al. |
| 5,732,400 A | 3/1998 | Mandler et al. |
| 5,734,890 A * | 3/1998 | Case et al. .......................... 1/1 |
| 5,794,207 A | 8/1998 | Walker et al. |
| 5,797,127 A | 8/1998 | Walker et al. |
| 5,822,736 A | 10/1998 | Hartman et al. |
| 5,826,244 A | 10/1998 | Huberman |
| 5,835,896 A | 11/1998 | Fisher et al. |
| 5,837,071 A | 11/1998 | Andersson et al. |
| 5,842,178 A | 11/1998 | Giovannoli |
| 5,845,265 A | 12/1998 | Woolston |
| 5,850,442 A | 12/1998 | Muftic |
| 5,870,721 A | 2/1999 | Norris |
| 5,878,400 A | 3/1999 | Carter, III |
| 5,890,138 A | 3/1999 | Godin et al. |
| 5,897,620 A | 4/1999 | Walker et al. |
| 5,903,830 A | 5/1999 | Joao et al. |
| 5,923,741 A * | 7/1999 | Wright et al. ............ 379/114.01 |
| 5,933,817 A | 8/1999 | Hucal |
| 5,940,807 A | 8/1999 | Purcell |
| 5,945,653 A | 8/1999 | Walker et al. |
| 5,950,172 A * | 9/1999 | Klingman .................... 705/27.1 |
| 5,960,411 A | 9/1999 | Hartman et al. |
| 5,966,697 A | 10/1999 | Fergerson et al. |
| 5,970,478 A | 10/1999 | Walker et al. |
| 5,974,396 A | 10/1999 | Anderson et al. |
| 5,974,406 A | 10/1999 | Bisdikian et al. |
| 5,987,434 A | 11/1999 | Libman |
| 5,995,943 A | 11/1999 | Bull et al. |
| 6,014,638 A | 1/2000 | Burge et al. |
| 6,016,484 A | 1/2000 | Williams et al. |
| 6,026,383 A | 2/2000 | Ausubel |
| 6,035,289 A | 3/2000 | Chou et al. |
| 6,052,670 A | 4/2000 | Johnson |
| 6,055,519 A | 4/2000 | Kennedy et al. |
| 6,055,573 A | 4/2000 | Gardenswartz et al. |
| 6,064,981 A | 5/2000 | Barni et al. |
| 6,078,906 A | 6/2000 | Huberman |
| 6,101,484 A * | 8/2000 | Halbert et al. ............... 705/26.2 |
| 6,108,632 A | 8/2000 | Reeder et al. |
| 6,108,639 A | 8/2000 | Walker et al. |
| 6,112,185 A | 8/2000 | Walker et al. |
| 6,112,189 A | 8/2000 | Rickard et al. |
| 6,131,087 A | 10/2000 | Luke et al. |
| 6,141,653 A | 10/2000 | Conklin et al. |
| 6,151,588 A | 11/2000 | Tozzoli et al. |
| 6,154,738 A | 11/2000 | Call |
| 6,167,383 A | 12/2000 | Henson |
| 6,195,646 B1 | 2/2001 | Grosh et al. |
| 6,219,653 B1 | 4/2001 | O'Neill et al. |
| 6,233,566 B1 | 5/2001 | Levine et al. |
| 6,236,972 B1 | 5/2001 | Shkedy |
| 6,236,977 B1 | 5/2001 | Verba et al. |
| 6,236,978 B1 * | 5/2001 | Tuzhilin ....................... 705/7.29 |
| 6,249,772 B1 | 6/2001 | Walker et al. |
| 6,253,189 B1 | 6/2001 | Feezell et al. |
| 6,260,019 B1 | 7/2001 | Courts |
| 6,260,024 B1 | 7/2001 | Shkedy |
| 6,266,651 B1 | 7/2001 | Woolston |
| 6,269,343 B1 * | 7/2001 | Pallakoff ...................... 705/26.2 |
| 6,289,348 B1 | 9/2001 | Richard et al. |
| 6,323,894 B1 | 11/2001 | Katz |
| 6,327,574 B1 | 12/2001 | Kramer et al. |
| 6,332,127 B1 | 12/2001 | Bandera et al. |
| 6,332,135 B1 | 12/2001 | Conklin et al. |
| 6,336,105 B1 | 1/2002 | Conklin et al. |
| 6,338,050 B1 * | 1/2002 | Conklin et al. ................. 705/80 |
| 6,360,205 B1 | 3/2002 | Iyengar et al. |
| 6,397,208 B1 | 5/2002 | Lee |
| 6,415,270 B1 | 7/2002 | Rackson et al. |
| 6,418,415 B1 | 7/2002 | Walker et al. |
| 6,418,441 B1 | 7/2002 | Call |
| 6,449,601 B1 | 9/2002 | Friedland et al. |
| 6,450,407 B1 | 9/2002 | Freeman et al. |
| 6,456,986 B1 | 9/2002 | Boardman et al. |
| 6,466,919 B1 | 10/2002 | Walker et al. |
| 6,496,568 B1 | 12/2002 | Nelson |
| 6,505,046 B1 | 1/2003 | Baker |
| 6,507,279 B2 | 1/2003 | Loof |
| 6,519,571 B1 | 2/2003 | Guheen et al. |
| 6,553,346 B1 | 4/2003 | Walker et al. |
| 6,553,350 B2 * | 4/2003 | Carter ............................. 705/20 |
| 6,560,501 B1 | 5/2003 | Walser et al. |
| 6,578,014 B1 | 6/2003 | Murcko, Jr. |
| 6,584,451 B1 | 6/2003 | Shoham et al. |
| 6,587,835 B1 | 7/2003 | Treyz et al. |
| 6,598,026 B1 | 7/2003 | Ojha et al. |
| 6,601,043 B1 | 7/2003 | Purcell |
| 6,604,089 B1 | 8/2003 | Van Horn et al. |
| 6,606,607 B1 | 8/2003 | Martin et al. |
| 6,607,136 B1 | 8/2003 | Atsmon et al. |
| 6,631,356 B1 * | 10/2003 | Van Horn et al. ............ 705/26.2 |
| 6,647,257 B2 | 11/2003 | Owensby |
| 6,647,373 B1 | 11/2003 | Carlton-Foss |
| 6,658,093 B1 | 12/2003 | Langseth et al. |
| 6,662,194 B1 | 12/2003 | Joao et al. |
| 6,716,101 B1 | 4/2004 | Meadows et al. |
| 6,754,636 B1 | 6/2004 | Walker et al. |
| 6,778,968 B1 | 8/2004 | Gulati |
| 6,782,370 B1 | 8/2004 | Stack |
| 6,785,661 B1 | 8/2004 | Dixon et al. |
| 6,847,938 B1 | 1/2005 | Moore |
| 6,847,965 B2 | 1/2005 | Walker et al. |
| 6,850,907 B2 | 2/2005 | Lutnick et al. |
| 6,868,392 B1 | 3/2005 | Ogasawara |
| 6,871,140 B1 | 3/2005 | Florance et al. |
| 6,871,190 B1 | 3/2005 | Seymour et al. |
| 6,876,977 B1 | 4/2005 | Marks |
| 6,876,983 B1 * | 4/2005 | Goddard ......................... 705/37 |
| 6,877,655 B1 | 4/2005 | Robertson et al. |
| 6,877,665 B2 | 4/2005 | Challa et al. |
| 6,915,275 B2 | 7/2005 | Banerjee et al. |
| 6,925,446 B2 | 8/2005 | Watanabe |
| 6,928,416 B1 | 8/2005 | Bertash |
| 6,934,690 B1 * | 8/2005 | Van Horn et al. ............ 705/26.2 |
| 6,954,734 B1 | 10/2005 | Kuelbs et al. |
| 6,990,467 B1 | 1/2006 | Kwan |
| 6,992,794 B2 | 1/2006 | Keane et al. |
| 7,039,603 B2 | 5/2006 | Walker et al. |
| 7,047,206 B1 | 5/2006 | Schultze |
| 7,062,452 B1 | 6/2006 | Lotvin et al. |
| 7,065,494 B1 * | 6/2006 | Evans .......................... 705/7.32 |
| 7,069,228 B1 | 6/2006 | Rose et al. |
| 7,072,849 B1 | 7/2006 | Filepp et al. |
| 7,072,853 B2 | 7/2006 | Shkedi |
| 7,076,447 B1 | 7/2006 | Peyser et al. |
| 7,080,030 B2 | 7/2006 | Eglen et al. |
| 7,103,565 B1 | 9/2006 | Vaid |
| 7,107,225 B1 | 9/2006 | McClung, III |
| 7,107,226 B1 | 9/2006 | Cassidy et al. |
| 7,120,592 B1 | 10/2006 | Lewis |
| 7,124,099 B2 | 10/2006 | Mesaros |
| 7,124,107 B1 * | 10/2006 | Pishevar et al. .................. 705/37 |
| 7,133,835 B1 | 11/2006 | Fusz et al. |
| 7,143,057 B2 | 11/2006 | Kuelbs et al. |
| 7,146,330 B1 | 12/2006 | Alon et al. |
| 7,165,045 B1 | 1/2007 | Kim-E |
| 7,181,419 B1 | 2/2007 | Mesaros |
| 7,194,427 B1 | 3/2007 | Van Horn et al. |
| 7,194,442 B1 | 3/2007 | Flanagan et al. |
| 7,213,754 B2 | 5/2007 | Eglen et al. |
| 7,254,833 B1 | 8/2007 | Cornelius et al. |
| 7,296,001 B1 | 11/2007 | Ephrati et al. |
| 7,330,826 B1 | 2/2008 | Porat et al. |
| 7,343,317 B2 | 3/2008 | Jokinen et al. |

| Patent No. | Date | Inventor(s) |
|---|---|---|
| 7,349,890 B1 | 3/2008 | Pathak et al. |
| 7,363,246 B1 * | 4/2008 | Van Horn et al. ............... 705/80 |
| 7,364,086 B2 | 4/2008 | Mesaros |
| 7,379,899 B1 | 5/2008 | Junger |
| 7,415,428 B2 | 8/2008 | Garwood |
| 7,415,617 B2 | 8/2008 | Ginter et al. |
| 7,433,832 B1 | 10/2008 | Bezos et al. |
| 7,464,051 B1 | 12/2008 | Heggem |
| 7,475,024 B1 | 1/2009 | Phan |
| 7,496,543 B1 | 2/2009 | Bamford et al. |
| 7,539,742 B2 | 5/2009 | Spector |
| 7,542,927 B2 | 6/2009 | Mukai |
| 7,552,069 B2 | 6/2009 | Kepecs |
| 7,584,146 B1 | 9/2009 | Duhon |
| 7,593,871 B1 | 9/2009 | Mesaros |
| 7,596,509 B1 | 9/2009 | Bryson |
| 7,599,857 B2 | 10/2009 | Bishop et al. |
| 7,606,731 B2 | 10/2009 | McClung, III |
| 7,624,044 B2 | 11/2009 | Wren |
| 7,630,919 B1 | 12/2009 | Obrecht |
| 7,636,672 B2 | 12/2009 | Angles et al. |
| 7,672,870 B2 | 3/2010 | Haines et al. |
| 7,680,696 B1 | 3/2010 | Murray |
| 7,689,463 B1 | 3/2010 | Mesaros |
| 7,689,468 B2 | 3/2010 | Walker et al. |
| 7,689,469 B1 | 3/2010 | Mesaros |
| 7,693,748 B1 | 4/2010 | Mesaros |
| 7,698,173 B1 | 4/2010 | Burge et al. |
| 7,698,208 B2 | 4/2010 | Hirani et al. |
| 7,698,240 B1 | 4/2010 | Chatterjee et al. |
| 7,706,838 B2 | 4/2010 | Atsmon et al. |
| 7,725,350 B2 | 5/2010 | Schlee |
| 7,729,977 B2 | 6/2010 | Xiao et al. |
| 7,747,473 B1 | 6/2010 | Mesaros |
| 7,792,699 B2 | 9/2010 | Kwei |
| 7,813,955 B2 | 10/2010 | Ariff et al. |
| 7,814,106 B2 | 10/2010 | Guido et al. |
| 7,815,114 B2 | 10/2010 | Mesaros |
| 7,818,212 B1 | 10/2010 | Mesaros |
| 7,860,776 B1 | 12/2010 | Chin et al. |
| 7,890,373 B2 | 2/2011 | Junger |
| 7,899,707 B1 | 3/2011 | Mesaros |
| 7,912,761 B2 | 3/2011 | Vaid |
| 7,917,386 B2 | 3/2011 | Christensen |
| 7,917,416 B2 | 3/2011 | Quinn et al. |
| 7,937,288 B2 | 5/2011 | Blaser et al. |
| 7,942,316 B2 | 5/2011 | Bennett et al. |
| 7,958,007 B2 | 6/2011 | Urbanski et al. |
| 8,005,747 B2 | 8/2011 | Forlai |
| 8,015,583 B2 | 9/2011 | Bates et al. |
| 8,024,226 B2 | 9/2011 | Fusz et al. |
| 8,032,409 B1 | 10/2011 | Mikurak |
| 8,032,422 B2 | 10/2011 | Pickard et al. |
| 8,036,941 B2 | 10/2011 | Bennett et al. |
| 8,073,762 B2 | 12/2011 | Sheth et al. |
| 8,140,402 B1 | 3/2012 | Mesaros |
| 8,140,405 B2 | 3/2012 | Mesaros |
| 8,140,442 B2 | 3/2012 | Heyer |
| 8,160,931 B2 | 4/2012 | Mesaros |
| 8,196,811 B2 | 6/2012 | Mesaros |
| 8,219,460 B1 | 7/2012 | Mesaros |
| 8,249,942 B2 | 8/2012 | Mesaros |
| 8,271,332 B2 | 9/2012 | Mesaros |
| 2001/0011264 A1 | 8/2001 | Kawasaki |
| 2001/0014868 A1 | 8/2001 | Herz et al. |
| 2001/0018660 A1 | 8/2001 | Sehr |
| 2001/0039514 A1 | 11/2001 | Barenbaum |
| 2001/0044751 A1 | 11/2001 | Pugliese, III et al. |
| 2001/0047296 A1 | 11/2001 | Wyker |
| 2001/0047311 A1 | 11/2001 | Singh |
| 2002/0026351 A1 | 2/2002 | Coleman |
| 2002/0032573 A1 | 3/2002 | Williams et al. |
| 2002/0035536 A1 | 3/2002 | Gellman |
| 2002/0040352 A1 | 4/2002 | McCormick |
| 2002/0046105 A1 | 4/2002 | Gardenswartz et al. |
| 2002/0046147 A1 | 4/2002 | Livesay et al. |
| 2002/0052782 A1 * | 5/2002 | Landesmann ............... 705/14 |
| 2002/0065762 A1 | 5/2002 | Lee et al. |
| 2002/0065769 A1 | 5/2002 | Irribarren et al. |
| 2002/0069079 A1 | 6/2002 | Vega |
| 2002/0080950 A1 | 6/2002 | Koko et al. |
| 2002/0082881 A1 | 6/2002 | Price et al. |
| 2002/0091580 A1 | 7/2002 | Wang |
| 2002/0099643 A1 | 7/2002 | Abeshouse et al. |
| 2002/0103741 A1 | 8/2002 | Boies et al. |
| 2002/0107773 A1 | 8/2002 | Abdou |
| 2002/0116282 A1 | 8/2002 | Martin et al. |
| 2002/0143692 A1 | 10/2002 | Heimermann et al. |
| 2002/0147670 A1 | 10/2002 | Lange |
| 2002/0165771 A1 | 11/2002 | Walker et al. |
| 2002/0165821 A1 | 11/2002 | Tree |
| 2002/0169703 A1 | 11/2002 | Lutnick et al. |
| 2002/0169759 A1 | 11/2002 | Kraft et al. |
| 2002/0174051 A1 | 11/2002 | Wise |
| 2002/0188508 A1 | 12/2002 | Lee et al. |
| 2003/0004802 A1 | 1/2003 | Callegari |
| 2003/0004808 A1 | 1/2003 | Elhaoussine et al. |
| 2003/0028473 A1 | 2/2003 | Eso et al. |
| 2003/0041002 A1 | 2/2003 | Hao et al. |
| 2003/0055774 A1 | 3/2003 | Ginsberg |
| 2003/0093355 A1 | 5/2003 | Issa |
| 2003/0109949 A1 | 6/2003 | Ikeda et al. |
| 2003/0111531 A1 | 6/2003 | Williams et al. |
| 2003/0115100 A1 | 6/2003 | Teicher |
| 2003/0126040 A1 | 7/2003 | Mesaros |
| 2003/0126250 A1 | 7/2003 | Jhanji |
| 2003/0149619 A1 | 8/2003 | Stanley et al. |
| 2003/0167222 A1 | 9/2003 | Mehrotra et al. |
| 2003/0195832 A1 | 10/2003 | Cao et al. |
| 2003/0208412 A1 | 11/2003 | Hillestad et al. |
| 2003/0216960 A1 | 11/2003 | Postrel |
| 2003/0233276 A1 | 12/2003 | Pearlman et al. |
| 2003/0233557 A1 | 12/2003 | Zimmerman |
| 2004/0015415 A1 | 1/2004 | Cofino et al. |
| 2004/0039661 A1 | 2/2004 | Fuzell-Casey et al. |
| 2004/0039677 A1 | 2/2004 | Mura et al. |
| 2004/0093276 A1 | 5/2004 | Nishio |
| 2004/0128197 A1 | 7/2004 | Bam et al. |
| 2004/0215500 A1 | 10/2004 | Monahan |
| 2005/0021400 A1 | 1/2005 | Postrel |
| 2005/0021401 A1 | 1/2005 | Postrel |
| 2005/0038713 A1 | 2/2005 | Pickard et al. |
| 2005/0149458 A1 | 7/2005 | Eglen et al. |
| 2005/0171918 A1 | 8/2005 | Eden et al. |
| 2005/0197857 A1 | 9/2005 | Avery |
| 2005/0216337 A1 | 9/2005 | Roberts et al. |
| 2005/0272442 A1 | 12/2005 | Miller et al. |
| 2005/0273415 A1 | 12/2005 | Mathews et al. |
| 2006/0036491 A1 | 2/2006 | Leung et al. |
| 2006/0059062 A1 | 3/2006 | Wood et al. |
| 2006/0069619 A1 | 3/2006 | Walker et al. |
| 2006/0095327 A1 | 5/2006 | Vaughn et al. |
| 2006/0095366 A1 | 5/2006 | Sheth et al. |
| 2006/0106678 A1 | 5/2006 | Walker et al. |
| 2006/0129454 A1 | 6/2006 | Moon et al. |
| 2006/0143080 A1 | 6/2006 | Garg et al. |
| 2006/0178918 A1 | 8/2006 | Mikurak |
| 2007/0150349 A1 | 6/2007 | Handel et al. |
| 2007/0220169 A1 | 9/2007 | Silver et al. |
| 2008/0015711 A1 | 1/2008 | Charland et al. |
| 2008/0052189 A1 | 2/2008 | Walker et al. |
| 2008/0082418 A1 | 4/2008 | Fordyce et al. |
| 2008/0126201 A1 | 5/2008 | Ullah |
| 2009/0055328 A1 | 2/2009 | Bamford et al. |
| 2009/0059856 A1 | 3/2009 | Kermoal et al. |
| 2009/0083136 A1 | 3/2009 | Blackwood |
| 2009/0089177 A1 | 4/2009 | Dayton et al. |
| 2009/0187455 A1 | 7/2009 | Fernandes et al. |
| 2009/0198622 A1 | 8/2009 | Temte et al. |
| 2009/0276305 A1 | 11/2009 | Clopp |
| 2009/0307073 A1 | 12/2009 | MirrokniBanadaki et al. |
| 2009/0327034 A1 | 12/2009 | Peterson |
| 2009/0327038 A1 | 12/2009 | Peterson |
| 2009/0327101 A1 | 12/2009 | Sayed |
| 2009/0327140 A1 | 12/2009 | Kuo |
| 2010/0088174 A1 | 4/2010 | Cohagan et al. |
| 2010/0125525 A1 | 5/2010 | Inamdar |
| 2011/0004515 A1 | 1/2011 | Mesaros |

| | | |
|---|---|---|
| 2011/0016010 A1 | 1/2011 | Mesaros |
| 2011/0040624 A1 | 2/2011 | Jhanji |
| 2011/0125592 A1 | 5/2011 | Mesaros |
| 2011/0213648 A1 | 9/2011 | Mesaros |
| 2011/0213649 A1 | 9/2011 | Mesaros |
| 2011/0213653 A1 | 9/2011 | Mesaros |
| 2011/0238476 A1 | 9/2011 | Carr et al. |
| 2011/0246271 A1 | 10/2011 | Mesaros |
| 2011/0246274 A1 | 10/2011 | Mesaros |
| 2011/0264499 A1 | 10/2011 | Abendroth et al. |
| 2011/0270699 A1 | 11/2011 | Mesaros |
| 2011/0270700 A1 | 11/2011 | Mesaros |
| 2012/0022970 A1 | 1/2012 | Mesaros |
| 2012/0029993 A1 | 2/2012 | Mesaros |
| 2012/0029995 A1 | 2/2012 | Mesaros |
| 2012/0035999 A1 | 2/2012 | Mesaros |
| 2012/0036000 A1 | 2/2012 | Mesaros |
| 2012/0036031 A1 | 2/2012 | Mesaros |
| 2012/0041811 A1 | 2/2012 | Mesaros |
| 2012/0054012 A1 | 3/2012 | Mesaros |
| 2012/0158475 A1 | 6/2012 | Mesaros |
| 2012/0179526 A1 | 7/2012 | Mesaros |
| 2012/0179530 A1 | 7/2012 | Mesaros |
| 2012/0197705 A1 | 8/2012 | Mesaros |
| 2012/0197722 A1 | 8/2012 | Mesaros |
| 2012/0203603 A1 | 8/2012 | Mesaros |
| 2012/0203611 A1 | 8/2012 | Mesaros |
| 2012/0203615 A1 | 8/2012 | Mesaros |
| 2012/0209683 A1 | 8/2012 | Mesaros |
| 2012/0209737 A1 | 8/2012 | Mesaros |
| 2012/0209738 A1 | 8/2012 | Mesaros |
| 2012/0209739 A1 | 8/2012 | Mesaros |
| 2012/0209740 A1 | 8/2012 | Mesaros |
| 2012/0209743 A1 | 8/2012 | Mesaros |
| 2012/0226541 A1 | 9/2012 | Mesaros |

FOREIGN PATENT DOCUMENTS

| | | |
|---|---|---|
| JP | 11-184910 | 7/1999 |
| WO | 9821713 | 5/1998 |
| WO | WO 9821713 A2 | 5/1998 |
| WO | 0050970 A2 | 8/2000 |
| WO | WO 00/70424 A2 | 11/2000 |
| WO | WO 2008/083371 | 7/2008 |

OTHER PUBLICATIONS

OA dated Apr. 16, 2010 for U.S. Appl. No. 12/042,051, 32 pages.
OA dated Apr. 29, 2010 for U.S. Appl. No. 10/464,585, 16 pages.
OA Dated Apr. 10, 2009 for U.S. Appl. No. 10/351,069, 27 pages.
OA Dated Apr. 6, 2009 for U.S. Appl. No. 11/680,431, 33 pages.
OA Dated Feb. 6, 2009 for U.S. Appl. No. 09/626,296, 11 pages.
OA Dated Mar. 25, 2009 for U.S. Appl. No. 11/556,604, 59 pages.
OA Dated Nov. 3, 2008 for U.S. Appl. No. 11/150,920, 161 pages.
OA Dated Oct. 20, 2008 for U.S. Appl. No. 10/464.585, 11 pages.
OA Dated Oct. 27, 2008 for U.S. Appl. No. 11/464,376, 13 pages.
OA Dated Oct. 29, 2008 for U.S. Appl. No. 11/152,462, 27 pages.
O'Gorman, et al. Considerations for Connecting Renewable Generation into Bulk Supply Networks. Sixth International Conference on Advances in Power System Control, Operation and Management, ASDCOM 2003, vol. 2, Nov. 11-14, pp. 674-680. Last accessed Sep. 10, 2009, 7 pages.
Rahim, et al. Optimal Decision Rules for Determining the Length of Production Run, (Abstract Only), Computers and Industrial Engineering, vol. 9, No. 2, pp. 195-202, 1985.
Rahim, et al. "Optimal Production Run for a Process with Random Linear Drift," (Abstract only), Omega, vol. 16, No. 4, pp. 347-351, 1988.
Scott. Chains of Trust, Supply Chain Management, Manufacturing Engineer, vol. 75, issue 4, Aug. 1996, pp. 172-174.
Scott. Supply Partnerships in the Aerospace Industry. Transforming Your Material Flow: A Practical Insight Into World Class Logistics and Supply Chain Management IEE Colloquium on, Oct. 24, 1996, pp. 3/1-3/3.
Scott. Supply Partnerships and the Effective Management of Low Cost Components. Transforming Your Material Flow: A Practical Insight Into World Class Logistics and Supply Chain Management IEE Colloquium on, Mar. 19, 1996, pp. 2/1-2/4.
Sivakumar, et al. Price Match Guarantees: Rationale, Implementation, and Consumer Response. Pricing Strategy and Practice, Bradford, 1996, vol. 4, issue 4, 11 pgs. Recovered from ProQuest Database Aug. 25, 2006.
Sjostrom. Price Discrimination by Shipping Conferences. Logistics and Transportation Review, Jun. 1992, [from Dialog® File 15, acc. No. 00727777 93-76998].
Stacklin. "Bridgestone Printing Unit Teams with ewinwin", Mar. 25, 2002, Crain's Cleveland Business, vol. 23, issue 12, 3 pages.
Tanaka. "As Other Companies Crumble, Ecount Carves Out Niche in Online-Payment Services." Knight Rider Tribune News Service, Washington, Feb. 27, 2002. (Recovered from ProQuest Database Dec. 4, 2006.).
Thomas, et al. JIT: Strategies for Distant Suppliers (Abstract). Business, vol. 40, No. 4, pp. 36-39, Dec. 1990.
Watson. The Effects of Demand Forecast Fluctuations on Customer Service and Inventory Cost When Demand is Lumpy. Journal of the Operational Research Society, vol. 38, No. 1, pp. 75-82, Jan. 1987. http://www.palgrave-journals.com/jors/journal/v38/n1/abs/jors19879a.html. Last accessed Sep. 10, 2009, 8 pages.
Wayback Machine. "Searched for http://www.ewinwin.com/corp/ewinwinwhitepaper.pdf", Oct. 2, 2008, Archive.org.
Yeh, et al. "Optimal Production Run Length for Products Sold with Warranty," (Abstract only), European Journal of Operational Research, vol. 120, No. 3, pp. 575-582, Feb. 1, 2000.
"Supplier pricing and lot sizing when demand is price sensitive". Abad, P.L. Fac. of Bus., McMaster Univ., Hamilton, Ont., Canada. European Journal of Operational Research, vol. 78, No. 3, p. 334-354. Date: Nov. 10, 1994 [recovered from Dialog on Oct. 20, 2009]. Cited by examiner, 1 page.
Efficient bid pricing based on costing methods for Internet bid systems Sung Eun Park; Yong Kyu Lee. Dept. of Comput. Eng., Dongguk Univ., South Korea. Book Title: Web Information Systems-WISE 2006. 7th International Conference on Web Information Systems Engineering. Proceedings (Lecture Notes in Computer Science vol. 42) [recovered from Dialog on ]. Cited by examiner, 1 page.
Advisory Action Dated Apr. 29, 2010 for U.S. Appl. No. 11/680,431.
OA dated Sep. 17, 2010 for U.S. Appl. No. 11/618,412, 97 pages.
Mack, Going Local. © 2006 ProQuest Info&Learning. Last accessed Sep. 17, 2010, 2 pages.
De Gheest, Computer Implemented Electronic Bidding for Electronic Sales Application. Derwent Acc No. 2001-006585, © 2010 Derwent Information Ltd. Last accessed Sep. 17, 2010, 2 pages.
Swartz, Wireless Ads: Loved/Loathed. Wireless Review. © 2006 The Gale Group. Last accessed Sep. 17, 2010, 3 pages.
OA dated Sep. 30, 2010 for U.S. Appl. No. 11/618,418, 125 pages.
OA dated Aug. 4, 2010 for U.S. Appl. No. 11/680,415, 65 pages.
OA dated Oct. 21, 2010 for U.S. Appl. No. 12/788,513, 62 pages.
OA mailed Mar. 21, 2011 for U.S. Appl. No. 12/887,778, 38 pages.
OA mailed Feb. 18, 2011 for U.S. Appl. No. 11/680,431, 33 pages.
OA mailed Jan. 24, 2011 for U.S. Appl. No. 11/680,415, 24 pages.
OA mailed Feb. 23, 2011 for U.S. Appl. No. 11/618,412, 27 pages.
OA mailed Mar. 28, 2011 for U.S. Appl. No. 11/618,418, 22 pages.
OA mailed Jan. 21, 2011 for U.S. Appl. No. 12/881,923, 48 pages.
OA dated Apr. 6, 2011 for U.S. Appl. No. 12/788,513, 38 pages.
OA dated Sep. 12, 2011 for U.S. Appl. No. 09/922,884, 31 pages.
OA dated Aug. 18, 2011 for U.S. Appl. No. 12/881,923, 32 pages.
OA dated Aug. 2, 2011 for U.S. Appl. No. 11/680,415, 27 pages.
OA dated Jul. 28, 2011 for U.S. Appl. No. 12/704,280, 55 pages.
OA dated Sep. 2, 2011 for U.S. Appl. No. 11/680,431, 24 pages.
U.S. Appl. No. 13/269,360 Final Office Action mailed Jul. 6, 2012.
U.S. Appl. No. 12/710,095 Final Office Action mailed Jun. 28, 2012.
U.S. Appl.No. 12/881,923 Office Action mailed Jun. 29, 2012.
U.S. Appl. No. 13/345,681 Office Action mailed Jun. 20, 2012.
U.S. Appl. No. 11/618,412 Final Office Action mailed May 1, 2012.
U.S. Appl. No. 13/271,464 Office Action mailed May 10, 2012.
U.S. Appl. No. 09/922,884 Office Action mailed May 1, 2012.
U.S. Appl. No. 13/104,723 Final Office Action mailed Jun. 8, 2012.
U.S. Appl. No. 13/270,133 Final Office Action mailed Jun. 12, 2012.
U.S. Appl. No. 13/292,971 Office Action mailed Jun. 14, 2012.
U.S. Appl. No. 13/272,144 Office Action mailed May 16, 2012.
U.S. Appl. No. 11/680,415 Final Office Action mailed May 2, 2012.

Accompany: How it Works: "Anatomy of a Buy-Cycle", Jun. 15, 1999, pp. 1-3.
Amazon.com, "Earths Biggest Selection," Jun. 30, 2001, archived by Archive.org: http://web.archive.org/web/20010630130618/http://www.amazon.com/exec/obidos/subst/home/home.html.
Boroshok, Jon, "Wireless, Location-Based, Shopping Portal being Tested in New York City and San Francisco by GeePS.com, Inc.," published Apr. 3, 2000, New York, NY and San Francisco, CA; as downloaded from http://www.techmarcom.com/geeps.html on Jan. 6, 2012.
Business/High Tech Editors "Mercata Launches Compelling Alternative to Online Auctions," Business Wire, Nov. 15, 2000.
ebay.com "eBay Services: The Feedback Forum," Aug. 1, 2001, archived by archive.org: "http://web.archive.org/web/20010801145144/http://pages.ebay.com/services/forum/feedback.html".
Ha, Sung Ho et al., "Matching Buyers and Suppliers: An Intelligent Dynamic-Exchange Model," IEEE Intelligent Systems, 2001.
Hinze, Annika et al., "Location- and Time- Based Information Delivery in Tourism," as downloaded Apr. 20, 2012 from http://page.mi.fu-berlin.de/voisard/Papers/sstd03.pdf.
IEEE Xplore Search Results, Aug. 12, 2007.
Mercata.com "How to Ship an Order" Oct. 22, 2000, archived by archive.org: http://web.archive.org/web/20001022035135/http://www.mercata.com/cgi-bin/mercata/mercata/v1/pages/editorial.jsp?name=Ship+an+Order.
Rajaraman, Rajesh et al., "The Effect of Demand Elasticity on Security Prices for the Poolco and Multi-Lateral Contract Models," IEEE Transactions on Power Systems, vol. 12, No. 3, Aug. 1997.
WHN Selects MobShop to Power Aggregated Buying for WHN Exchange. Jan. 23, 2001. http://www.allbusiness.com/retail-trade/4291613-1.html. Last accessed Sep. 11, 2009, 2 pages.
U.S. Appl. No. 09/922,884 Final Office Action mailed Jan. 4, 2012.
U.S. Appl. No. 13/104,723 Office Action mailed Mar. 22, 2012.
U.S. Appl. No. 13/270,133 Office Action mailed Jan. 3, 2012.
U.S. Appl. No. 13/272,147 Office Action mailed Jan. 10, 2012.
U.S. Appl. No. 12/710,095 Office Action mailed Apr. 6, 2012.
U.S. Appl. No. 13/161,192 Office Action mailed Apr. 5, 2012.
U.S. Appl. No. 13/251,668 Office Action mailed Feb. 9, 2012.
U.S. Appl. No. 13/251,668 Final Office Action mailed Apr. 17, 2012.
U.S. Appl. No. 13/160,128 Final Office Action mailed Feb. 22, 2012.
U.S Appl. No. 13/105,387 Office Action mailed Jan. 3, 2012.
Adam et al. "Strategic Directions in Electronic Commerce and Digital Libraries: Towards a Digital Agora". *ACM Computing Surveys* [Online] 1996, vol. 28, Issue 4, pp. 818-835.
OA dated Nov. 17, 2011 for U.S. Appl. No. 09/922,884, 13 pages.
Tippr http://www.tipper.com/ Internet Archive (Feb. 29, 2008)—http://web.archive.org/web/20080229121727/http://tippr.com/.
OA dated Nov. 17, 2011 for U.S. Appl. No. 12/704,280, 18 pages.
Notice of Allowance mailed dated Dec. 5, 2011 for U.S. Appl. No. 12/539,714, 26 pages.
First Office Action dated Nov. 4, 2011 for U.S. Appl. No. 13/160,128, 58 pages.
Mercata.com, Archived by Archive.org on or before Jun. 19, 2000.
Kauffman et al., "Bid Together Buy Together; on the efficacy of group-buying business models in Internet-based Selling", May 16, 2001.
OA dated Oct. 24, 2011 for U.S. Appl. No. 11/618,412, 42 pages.
OA dated Jan. 3, 2012 for U.S. Appl. No. 13/105,387, 107 pages.
Garner, K., "Culture Vulture: up from under—Germaine Greer," Off Our Backs, Jun. 24, 1971, vol. 1, Iss. 23, p. 14.
OA dated Dec. 16, 2011 for U.S. Appl. No. 11/618,418, 29 pages.
OA dated Oct. 8, 2011 for U.S. Appl. No. 12/788,513, 61 pages.
OA dated Jan. 4, 2012 for U.S. Appl. No. 09/922,884, 13 pages.
OA dated Jan. 10, 2012 for U.S. Appl. No. 13/272,147, 13 pages.
Anon. "Open Market Introduces New Software for Dynamic Web-based Commerce" PR Newswire, Oct. 1, 1996.
Millman, H. "Legacy Data Links Shrink Costs," InfoWorld, vol. 20, No. 1, pp. 51, 56, Jan. 5, 1998.
Anon. "ELCOM: Virgin Trains Cuts Procurement Costs with elcom.com; New Electronic Ordering System Offers Personalised Pricing," M2 Presswire, Jul. 18, 2000.
OA dated Jan. 3, 2012 for U.S. Appl. No. 13/270,133, 14 pages.

OA dated Oct. 28, 2011 for U.S. Appl. No. 12/539,714, 89 pages.
OA dated Dec. 22, 2011 for U.S. Appl. No. 13/269,360, 19 pages.
Office Action dated Dec. 9, 2011 for U.S. Appl. No. 13/160,128, 58 pages.
Office Action dated Dec. 28, 2011 for U.S. Appl. No. 13/275,054, 17 pages.
Office Action dated Dec. 29, 2011 for U.S. Appl. No. 13/274,213, 18 pages.
Rozic, Jeff, "Who's Watching While You Surf?", Inside Business 3, 5, 64, May 2001.
"Excite@Home Standardizes on Siebel eBusiness; Leading Broadband Media Company Relies on Siebel Systems to Manage Customer Relationships Across Its Entire Family of Services," Business Wire, Jan. 19, 2000.
"Global Real Estate Markets Spell Opportunity, Experts Tell Realtors," PR Newswire, Nov. 21, 1991.
"Lucent Launches On-Line Catalog" M2 Presswire, Jan. 22, 1999.
"Screen Savers," Lawyer, Feb. 19, 2001.
"The Oil and Gas Asset Clearinghouse, a Pertoleum Place Company, to Host It's Second Exclusively Online Auction of Oil and Gas Properties on Aug. 14-16, 2000." PR Newswire, p. 5591, Aug. 3, 2000, 2 pages.
Amazon.com, "Help/Shipping", Archived on Feb. 2, 2003 by www.archive.org. Last accessed Mar. 19, 2008, 9 pages.
Ashton Technology Group, Inc. Announces NASDAQ National Market System Listing; Enters into Clearing Arrangements with 8 National Brokerage Firms, Business Wire, Jan. 3, 2000. http://www.findarticles.com/p/articles/mi_m0EIN/is_2000_Jan_3/ai_58429780/print. Last accessed Apr. 8, 2009, 3 pages.
Beaty. Mass Customisation. Manufacturing Engineer, vol. 75, issue 5, Oct. 1996, pp. 217-220.
Blyth, et al. Merchandising System Collecting Data. Derwent Information Ltd. Last accessed Jan. 20, 2009, 2 pages.
Breyer. "Bargains in Cyberspace," National Home Center News, vol. 26, No. 21, p. 21, Nov. 20, 2000.
Business Editors and High Tech Writers, "eWinWin Announces the Release of DAS 3.0, the Next Generation of B2B Demand Aggregation Solutions" Dec. 28, 2000, Businee wire, p. 1 (4 pages).
Business Editors. "Weatherchem Announces Major eCommerce Success with eWinWin", Aug. 9, 2001, Business Wire, (p. 1) 2 pages.
CBOT, "Trading in Futures Can Provide Considerable Financial Rewards", Last accessed Mar. 19, 2008, 41 pages.
Chicago Board of Trade, "Knowledge Center," as archived by Archive.org, on Feb. 13, 2003.
China—Welcome to the Machine: New Machinery, Electronics B-to-B Website Launched. China Online, Jul. 24, 2000, 1 page.
Computer Geeks Discount Outlet, "Order Status," Mar. 1, 2002.
Deierlein. "Smart Fuel Buying," Fleet Equipment, vol. 24, No. 8, pp. 42-44, Aug. 1998.
Dibiase. The Inventory Simulator: A Micro Computer Based Inventory Model. Modeling and Simulation on Microcomputers, Paul F. Hogan, ed., Society for Computer Simulation (SCS), La Jolla, pp. 104-106, Jan. 1987.
DomainTradeLIVE? Launched by solutionhome.com. Business Wire, Oct. 20, 1999, 1 page.
Easley, et al. Time and the Process of Security Price Adjustment, Journal of Finance, vol. 47, No. 2, Jun. 1992. http://ideas.repec.org/a/bla/jfinan/v47y1992i2p576-605.html. Last accessed Sep. 10, 2009, 30 pages.
Edwards. "Increase Your Bottom Line : Automated Customer Service and Marketing," E-Business Advisor, vol. 17, No. 7, p. 30, Jul. 1999.
ENOS. Vying to be the Top Dog. Upside vol. 12, No. 3, pp. 160-165, Mar. 2000.
eWinWin, "eCommerce Redefined : The Positive Impact of eWinWin's Demand Aggregation System on the Manufacturing Supply Chain", Oct. 2000. Last accessed Mar. 19, 2008, 11 pages.
Gaonkar, et al. Strategic Sourcing and Collaborative Planning in Internet Enabled Supply Chain Networks Producing Multigeneration Products. IEEE Transactions on Automation Science and Engineering, vol. 2, issue 1, Jan. 2005, pp. 54-66.
Gurley. Creating a Great E-Commerce Business. Fortune, Mar. 16, 1998.

International Search Report for PCT Application No. PCT/US 07/89195, mailed May 12, 2008, 8 pages.

Jonsson, et al. Impact of Processing and Queueing Times on Order Quantities. Mater. Flow, vol. 2, No. 4, pp. 221-230, Aug. 1985. [cited by examiner in related U.S. Appl. No. 09/922,884 on May 7, 2004, but the examiner did not include a copy of the art per MPEP 707.05(a)].

Kantrow, American Express Sets a Three-Tier Pricing on Optima, Dialog: File 148 #05812190 (The Gale Group), American Banker, v157, n25, p1(2), Feb. 6, 1992.

Koenig, et al. Quantitative Industrial Ecology. IEEE Transactions on Systems, Man and Cybernetics, Part C, Issue 1, Feb. 1998, pp. 16-28.

Lamparter. "Natural Selection." American Printer, vol. 217, No. 3, pp. 54-64, Jun. 1996.

Magna Cash Cybersource Partner to Expand Online Payment Options. PR Newswire, New York, Jan. 15.

Market Engineering Research for Structural Impacts of e-Business in the European Chemicals Industry (Ch. 3), Structural Impact of e-Business on the Chemicals Industry, Frost & Sullivan, Market Research Report, Jun. 2001.

Maxwell, Pricing education in the United States of America: responding to the needs of business, The Journal of Product & Brand Management, Santa Barbara, Aug. 1998, vol. 7, Issue 4, p. 336-341.

Medrano, et al. Strategic Behaviour and Price Discovery, RAND Journal of Economics, vol. 32, No. 2, Jun. 21, 2001. https://editorialexpress.com/cgi-bin/rje_online.cgi?action=view&year=2001&issue=sum&page=221&&tid=83197&sc=uogfbloa. Last accessed Sep. 3, 2009, 29 pages.

Meriam Webster's Collegiate Dictionary, Tenth Edition, 1997, p. 732.

Meridex Introduces Advanced Features to its B2B Network, PR Newswire, May 25, 2000. Available online: http://www.canadait.com/cfm/index.cfm?It=106&Id=3421&Se=355&Sv=Company&Lo=441. Last accessed Apr. 30, 2009, 3 pages.

Mesaros. Innovation in Difficult Times : How US Manufacturers are Using Demand Aggregation to Increase Sales and Lower Costs. Jul. 26, 2001. Last accessed Mar. 19, 2008, 4 pages.

MobShop Launches New Rev of Selling App, Online Reporter, May 28, 2001. http://findarticles.com/p/articles/mi_hb5932/is_200105/ai_n23884526/. Last accessed Apr. 30, 2009, 2 pages.

MobShop Selected by WHN(TM) (WhatsHotNow.com (R), Inc.) to Power Demand Aggregation Within Its Licensed Merchandise Marketplace; Demand Aggregation Technology Enables Marketplaces to Improve Liquidity by Generating Volume Transactions, PR Newswire, San Francisco, Jan. 16, 2001 Alternative—http://www.allbusiness.com/retail-trade/4291613-1.html.

Moody. From E-Commerce to We-Commerce. Computer Weekly, 42, Jun. 3, 1999. Last accessed Apr. 9, 2009, 2 pages.

Mullich. Altrade Serves as a Natural Resource—A Head Start and Big Trading Volume Give the Natural Gas Marketplace a Competitive Edge. Can it Last? Information Week, 152, Jun. 12, 2000, 3 pages.

Myers. "E-Solutions for Surplus Inventory," DSN Retailing Today, vol. 39, No. 21, p. 13, Nov. 6, 2000.

Nellore, et al. Factors Influencing Success in Integrated Product Development (IPD) Projects. IEEE Transactions on Engineering Management, vol. 48, issue 2, May 2001, pp. 164-174.

OA dated Feb. 23, 2010 for U.S. Appl. No. 09/426,063, 11 pages.
OA dated Mar. 19, 2008 for U.S. Appl. No. 11/152,462, 26 pages.
OA dated Apr. 29, 2009 for U.S. Appl. No. 10/464,585, 19 pages.
OA dated Jul. 2, 2009 for U.S. Appl. No. 09/426,063, 24 pages.
OA dated Sep. 9, 2009 for U.S. Appl. No. 11/556,604, 60 pages.
OA dated Oct. 6, 2009 for U.S. Appl. No. 12/042,051, 53 pages.
OA dated Oct. 28, 2009 for U.S. Appl. No. 10/464,585, 37 pages.
U.S. Appl. No. 13/292,971 Office Action mailed Sep. 14, 2012.
U.S. Appl. No. 13/407,622 Office Action mailed Sep. 12, 2012.
U.S. Appl. No. 13/251,668 Office Action mailed Sep. 14, 2012.
U.S. Appl. No. 13/274,213 Final Office Action mailed Aug. 1, 2012.
U.S Appl. No. 13/105,387 Final Office Action mailed Aug. 15, 2012.

* cited by examiner

— 380

— 395

BILLING INFORMATION

Name
Company
Address 1
Address 2
City
State
Zip Code
Country
Phone
Fax
Email

SHIPPING INFORMATION

Name
Company
Address 1
Address 2
City
State
Zip Code
Country
Phone
Fax
Email

GIFT CERT./MERCH. CREDIT — 405

ADDITIONAL INSTRUCTIONS

SHIPPING INSTRUCTIONS

— 415

[CONTINUE]    [CANCEL]

BUYER REGISTRATION

BUYER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):

Fig. 10

ORDER AGGREGATION AND MERCHANT RANKING

CROSS REFERENCE TO RELATED APPLICATION

This application is a continuation of co-pending U.S. patent application Ser. No. 09/922,884, entitled E-COMMERCE VOLUME PRICING filed on Aug. 6, 2001, which:

(1) is a continuation-in-part of co-pending U.S. patent application Ser. No. 09/324,391, entitled E-COMMERCE VOLUME PRICING filed on Jun. 3, 1999, which claims priority to U.S. Patent Application Ser. No. 60/133,769, filed May 12, 1999, and entitled E-COMMERCE VOLUME PRICING;

(2) is a continuation-in-part of co-pending U.S. patent application Ser. No. 09/426,063, entitled MULTIPLE CRITERIA BUYING AND SELLING MODEL;

(3) is a continuation-in-part of co-pending P.C.T. Patent Application Serial No. PCT/US00/11989, filed May 3, 2000, and entitled MULTIPLE CRITERIA BUYING AND SELLING MODEL, AND SYSTEM FOR MANAGING OPEN OFFER SHEETS, which claims priority to: U.S. Patent Application Ser. No. 60/137,583, filed Jun. 4, 1999, and entitled E-COMMERCE AUTOMATED SELLER SELECTION SYSTEM; U.S. Patent Application Ser. No. 60/138,209, filed Jun. 9, 1999, and entitled SECURITIZATION OF ACCOUNTS RECEIVABLE; U.S. Patent Application Ser. No. 60/139,338, filed Jun. 16, 1999, and entitled REAL-TIME OPTIMIZED BUYING BLOCK; U.S. Patent Application Ser. No. 60/139,518, filed Jun. 16, 1999, and entitled REAL-TIME MARKET PURCHASING; U.S. Patent Application Ser. No. 60/139,519, filed Jun. 16, 1999, and entitled E-COMMERCE PURCHASING CARD; U.S. patent application Ser. No. 09/342,345, filed Jun. 29, 1999, and entitled CREDIT BASED TRANSACTION SYSTEM AND METHODOLOGY; U.S. Patent Application Ser. No. 60/142,371, filed Jul. 6, 1999, and entitled TIME VALUE OF MONEY BASED CREDIT CARD FOR MERCHANT; U.S. Patent Application Ser. No. 60/160,510, filed Oct. 20, 1999, and entitled MULTIPLE CRITERIA BUYING AND SELLING MODEL, AND SYSTEM FOR MANAGING OPEN OFFER SHEETS; U.S. patent application Ser. No. 09/426,063, filed Oct. 22, 1999, and entitled MULTIPLE CRITERIA BUYING AND SELLING MODEL; U.S. Patent Application Ser. No. 60/162,182, filed Oct. 28, 1999, and entitled MULTIPLE CRITERIA BUYING AND SELLING MODEL, AND SYSTEM FOR MANAGING OPEN OFFER SHEETS; and U.S. Patent Application Ser. No. 60/173,409, filed Dec. 28, 1999, and entitled MULTIPLE CRITERIA BUYING AND SELLING MODEL, AND SYSTEM FOR MANAGING OPEN OFFER SHEETS; and (4) claims priority to co-pending U.S. Patent Application Ser. No. 60/237,474, filed Oct. 2, 2000, and entitled MULTIPLE CRITERIA BUYING AND SELLING MODEL, AND SYSTEM FOR MANAGING OPEN OFFER SHEETS.

The entireties of all prior-filed applications listed herein are hereby incorporated by reference.

TECHNICAL FIELD

The present invention relates to a system and method that facilitates e-commerce volume pricing.

BACKGROUND OF THE INVENTION

The buying and selling of goods and services (collectively referred to as "products") has resulted in a vast array of costing schemes which are used to select the price at which such products are sold.

One of the most common costing schemes which consumers encounter everyday is known as fixed pricing. According to this costing scheme, sellers set a fixed price for their products based on a past demand for the product and/or anticipated future demand. Buyers desiring to purchase products from the seller are each required to pay the same fixed price regardless of the number of products purchased. If a seller finds that the demand for a given product is greater or less than expected, the seller can later adjust the fixed price of the product to account for such findings. Although the fixed pricing provides a simple way for a seller to conduct business with multiple buyers, one drawback of this costing scheme is that it fails to reward buyers willing to purchase greater quantities of products.

Another common costing scheme for pricing a product is an auction. In an auction, a seller sets an initial price for an item and then multiple buyers are given an opportunity to bid against each other for the product. The buyer having placed the highest bid for the product at the end of the auction purchases the product at the final price bid. Although auctions provide advantages when selling unique products for which customers are willing to competitively bid, the auction forum is not well suited for sellers desiring to sell large quantities of goods to multiple buyers given the inherent inefficiencies involved with selling one product at a time in a bidding environment.

Yet another costing scheme, which has been advanced in recent years, is buyer-driven bidding. According to this costing scheme, a single buyer desiring to obtain a product communicates a price at which the buyer is willing to purchase the product to multiple sellers. Each of the sellers is provided an opportunity to review the buyer's price. A sale is complete when one of the sellers agrees to sell the product to the buyer at the price suggested by the buyer. While the buyer-driven bidding scheme provides advantages for certain types of transactions when, for example, sellers may be willing to sell products at lower than normal prices, the uncertainties involved with whether a buyer's offer will be accepted is often problematic for high volume commercial transactions in which the reliability that a transaction will be complete is of paramount importance.

While the costing schemes described above have various advantages and disadvantages in different situations, a commonality among all of the costing schemes is that each buyer operates independently with one or more sellers to set a purchase price of a product in low volume transactions. Accordingly, there is a strong need in the art for a volume costing scheme which overcomes the above-mentioned drawbacks and others.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to one aspect of the present invention, a system and method that facilitates e-commerce volume pricing is provided. The e-commerce volume pricing system and methodology is structured to provide incentive for buyers to work together when purchasing products. By working together, buyers are able to take advantage of lower pricing due to quantity discounts. To facilitate buying and selling products using the e-commerce volume pricing system and methodology, an electronic forum is provided whereby buyers and sellers are able to conveniently exchange information and order products.

Thus, according to one aspect of the present invention, system for facilitating volume pricing is provided. The system includes an offers and orders component that receives and aggregates orders for a product from a plurality of buyers. The system also includes a logistics component that determines a shipping price for the product for a subset of the plurality of buyers. The shipping price is determined at least in part upon the subset of buyers sharing a shipping method.

In accordance with yet another aspect of the present invention, a method of costing is provided. The method includes electronically offering a product for sale, receiving a first order for the product from a first set of buyers at a first price, and receiving a second order for the product from a second set of buyers at a second price. A total quantity of products ordered from the first set of buyers and the second set of buyers is calculated and the first order is filled at a third price and the second order is filled at a fourth price, the third and fourth prices being based upon the total quantity of products ordered.

In accordance with another aspect of the present invention, a method of costing is provided. The method includes electronically offering a product for sale by a seller and receiving orders for the product from a plurality of buyers. A final price is determined for the product based upon the total quantity of products ordered from the plurality of buyers and the final price is then compared to a contract price between the seller and at least one of the plurality of buyers. If the final price is less than the contract price, the orders are filled for all of the plurality of buyers at the final price. However, if the final price is greater than the contract price, the orders for the at least one of the plurality of buyers is filled at the contract price and the orders for the other of the plurality of buyers is filled at the final price.

In accordance with yet another aspect of the present invention, a method of costing is provided. The method includes electronically offering a product for sale, receiving a first order for the product from a first set of buyers at a first price, and receiving a second order for the product from a second set of buyers at a second price. Third and fourth prices are determined for the first set of buyer and the second set of buyers, respectively, based upon the total quantity of products ordered. It is then determined whether the third price is less than a contract price between a seller and at least one of the first set of buyers. If the third price is not less than the contract price, the orders are filled for at least one of the first set of buyers at the contract price, the other of the first set of buyers at the third price, and the second set of buyers at the fourth price. Otherwise, the orders are filled at the third price for the first set of buyers and at the fourth price for the second set of buyers.

In accordance with yet another aspect of the present invention a volume pricing system is provided which includes a server configured to receive orders for a product from a plurality of different buyers via at least one remote computer system. The server includes a processor, a memory coupled to the processor, and a network interface coupled to the processor for transmitting and receiving data with the at least one remote computer system. The memory is utilized to store a first price schedule and a second price schedule, the first price schedule operable to determine a first price for the product for at least one of the plurality of different buyers and the second price schedule operable to determine a second price for the product for the other plurality of different buyers.

In accordance with another aspect of the present invention, a method of costing is provided. The method includes electronically offering a product for sale in accordance with a price schedule, the price schedule setting a price for the product which varies in accordance with a quantity of the product ordered and receiving orders for the product from a plurality of different buyers. The total quantity of products ordered from the plurality of different buyers is calculated. A shipping price is then determined from at least one of the plurality of different buyers sharing a shipping method with at least another of the plurality of different buyers. A final price for the product is determined from the price schedule based on the total quantity of products ordered and the determined shipping price and the orders are filled for the plurality of different buyers at the final price.

In accordance with another aspect of the present invention, a data packet is provided. The data packet is adapted to be transmitted between two or more computer processes and includes, one or more first fields adapted to store at least one pricing structure for a product, one or more second fields adapted to store orders from a plurality of buyers for the product, and one or more third fields adapted to store a final price for the product based upon the total quantity of products ordered from the plurality of buyers or a Not To Exceed (NTE) contract price between the seller and at least one of the plurality of buyers.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

In the annexed drawings:

FIG. 9 illustrates a continuation of the web page in FIG. 6 in accordance with one aspect of the present invention;

FIG. 10 illustrates an on-line registration form for a buyer in accordance with one aspect of the present invention;

DETAILED DESCRIPTION OF THE INVENTION

Figure 1:
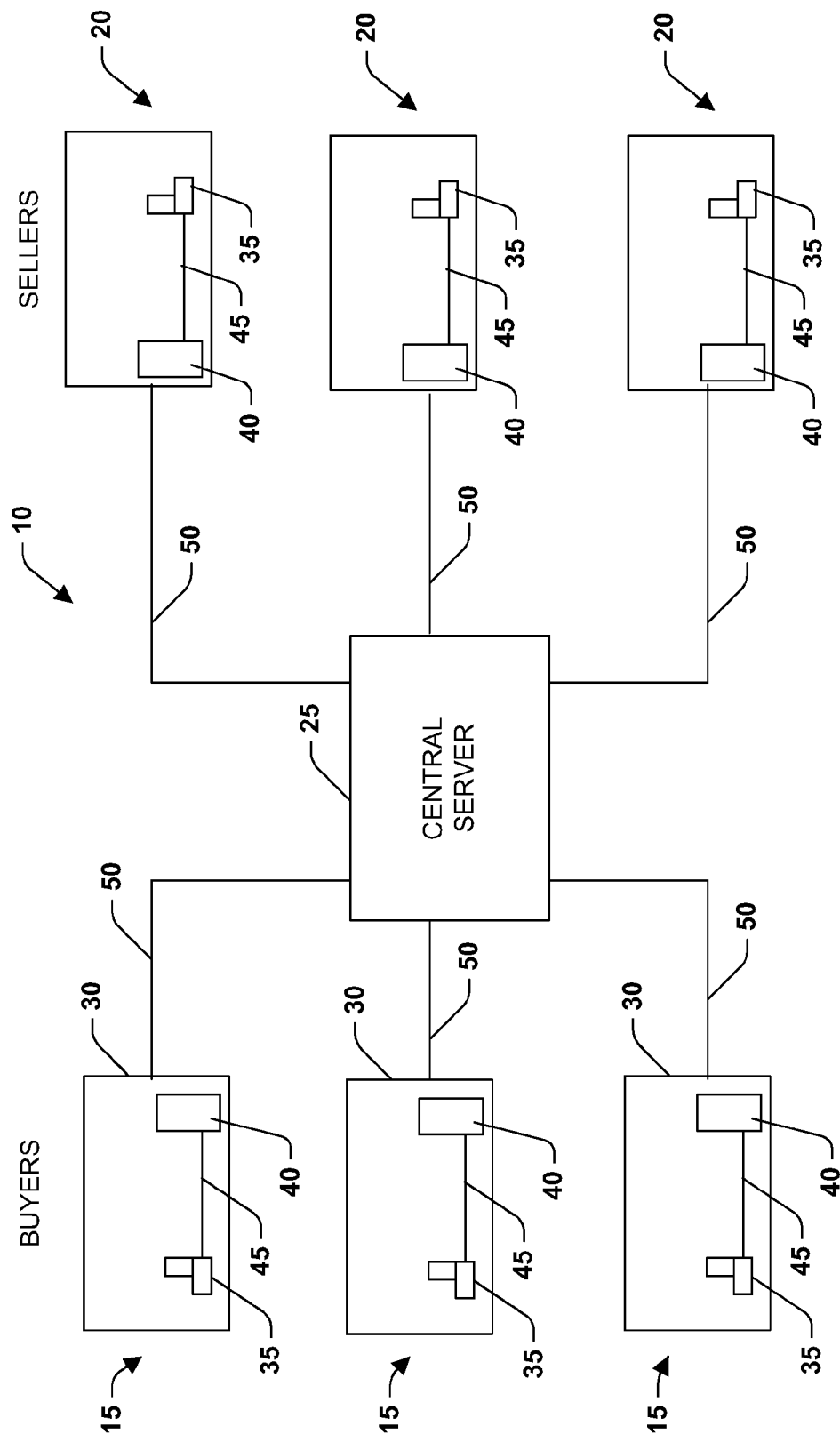
FIG. 1 illustrates a diagrammatic view of a system for electronically conducting business in accordance with one aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block form in order to facilitate describing the present invention.

Referring initially to FIG. 1, a system 10 is shown in which multiple buyers 15 and sellers 20 are electronically linked via a central server 25. As discussed in more detail below, the central server 25 is configured to provide the buyers 15 and sellers 20 with a convenient forum in which to buy and sell goods in accordance with a volume pricing methodology described herein. The forum can, for example, be an established Internet web page where sellers 20 are able to post product information and the buyers 15 are able to order the products.

Each of the buyers 15 and sellers 20 can access the central server 25 in any of a variety of ways. For example, each buyer 15 and seller 20 is shown to be part of separate establishments 30 which include one or more respective computer systems 35 and local servers 40. The computer systems 35 can, for example, be a desktop or laptop computer with a local area network (LAN) interface for communicating over a network backbone 45 to the local server 40. The local servers 40, in turn, interface with the central server 25 via a network cable 50 or the like. It will be appreciated that while the computer system 35 is depicted as communicating with the central server 25 via hardwired network connections, alternatively, the computer system 35 can interface with the central server 25 using a modem, wireless local area and/or wide area networks, etc. Further, it will be appreciated, that while the buyers 15 and sellers 20 are shown to communicate with the central server 25 via different computer systems 35, it will be appreciated that the buyers 15 and/or sellers 20 can access the central server 25 from the same computer system 25.

As used in this application, the terms "component" and "module" are intended to refer to a computer-related entity, either hardware, a combination of hardware and software, software, or software in execution. For example, a component and/or module may be, but is not limited to, a process running on a processor, a processor, an object, an executable, a thread of execution, a program, and a computer. By way of illustration, both an application running on a server and the server can be a component and/or module.

The underlying architecture of the software system used to provide buyers and sellers with a forum for conducting business is created as a collection of components. Component-based architecture allows separate sections of code to stand alone from one another, thus allowing for easier replacement, debugging, removal, updating, etc. Components also allow multiple users to work independently on separate components without interference from other components. For example, a component could be reprogrammed to enhance its speed without necessitating the recoding of half of the system as might be required in a non-component based system. Furthermore, custom components can be developed for specific customers based upon the requirements of the customers. Such components can be further customized to interact directly with the customers' systems. The component-based system also has the ability to recognize when two or more users are simultaneously making changes to a component or module. Thus, the system can accommodate for the simultaneous changes to mitigate any problems that might occur. For example, a locking or change comparison process can prevent a first user from writing over new data, entered by a second user, with old data.

The kernel component is the central component in the operating system. Typically, the kernel is responsible for memory management, process and task management, and disk management. In the present invention, the kernel component is divided into twelve functional modules. However, it is to be appreciated that the number of modules is not essential to the invention. Thus, a kernel containing more or less than twelve modules, which performs the functions as described herein, is contemplated as falling within the scope of the present invention.

The first module is an offers and orders module, which manages the offers and orders for products, such as posting, processing, storing, etc. The second module is a catalog module, which manages seller catalogs, product categories, and products. The third module is a users and groups module. This module allows for the storage, creation, editing, and deletion of users and groups and will generally be used by the deal rooms. The fourth module, an access control module, is responsible for enabling users and groups to see what they have been authorized to see and similarly, perform the tasks that they have been authorized to perform.

The fifth module is a messaging module, which allows various module functions to be invoked by the user interface and/or remote integrated systems. The messaging functionality may also be embedded into other modules. The sixth module is a terms and conditions module, which manages agreements between parties involved in each transaction, such as the terms and conditions agreed to between buyer and seller, buyer and system administrator, seller and system administrator, etc. The seventh module is a blanket pricing module. This module manages agreements between buyers and sellers as to product prices. The eighth module, a product relationships module, allows sellers to create relationships between related products. The ninth module is a logistics module, which allows for the management of the product shipment. A RFQ/RFO/RFP module manages quote, offer, and product requests. The eleventh module is an invoicing module, which manages administrative functions, such as record keeping, invoicing, credit checks, etc. Finally, an agents module is used to automate routine tasks and/or to provide decision support and guidelines.

Modules allow for greater flexibility and customization since they can be enabled or disabled for the entire system on a user-by-user, group-by-group, access point-by-access point basis. The purpose of allowing the enabling and disabling of modules is necessary because there may be some modules that a user does not require or is not licensed to use. Furthermore, modules may need to be disabled for maintenance, troubleshooting, or upgrading. Function enabling/disabling is designed to allow the system administrator or host to prevent user access to certain features. It is to be further noted that functions within one module can be dependent upon functions in another module. Thus, modules are able to communicate amongst each other. It is possible that modules may reside on separate servers, thus allowing the system to easily handle increases in volume.

The offers and orders module contains the logic necessary to perform functions in relation to offers and orders, such as creating, storing, editing, and deleting. This module can also manage options, smart offers, shopping carts, multiple line item orders, derived offers, the offer finder, order approval, commit-at-price orders, quote generation, multiple line item quotes, discounts, gift certificates/merchandise credits, and other related functions.

Offers are typically made to present product options to a buyer. Pricing for offers can be in terms of percent markup/markdown, flat fee/savings, fee-per-item/savings-per-item, or aggregate options. Two types of offers are available: single offers and aggregate offers. A single offer is one in which the final price of a product is determined by an individual buyer. The price can be dependent upon the volume of product that the individual buyer is purchasing or can be contractually negotiated between the seller and the individual buyer. On a single offer, once a final price has been determined and the individual buyer has placed an order, the offer is considered closed. However, it is possible for a buyer involved in a single offer transaction to benefit from an aggregate offer. For example, a buyer can require an earlier ship date than the date offered in the aggregate offer, thus the buyer can request a single offer from the seller. If the seller can manufacture the products ordered in the single offer in the same lot as the products ordered in the aggregate order, the seller can pass on the cost benefits in the single offer as well as in the aggregate offer.

An aggregate offer is one in which the final price of a product is determined by a plurality of buyers. The plurality of buyers can consist of individual buyers and/or purchasing groups. The plurality of buyers can place orders through an aggregation aware system, as described herein, as well as through a non-aggregation aware system. Generally, the net volume of product ordered by the plurality of buyers determines the final price of the product. A seller can provide a pricing structure/price curve or an equation to detail how the price of the product changes with the volume ordered. Additionally, or alternatively, the price of the product can change with respect to the time remaining on an open offer. For example, the seller can discount the product by 25% during the last five days of the offer or the price can be programmed to regularly drop by a percentage throughout the time period of the offer until a hidden price point is reached. Other factors which can affect the product pricing strategy include: market conditions, time remaining before shipment, the number of current orders on an offer, the quantity of product still available, and the number of buyers currently participating in the offer.

The final price for the product is not calculated until the order close date, which can be extended by the seller up until the ship date. Thus, based on the cumulative orders received at the end of an "open session" period, a seller can provide all buyers with the same quantity discount for the product regardless of what the price of the product was at the time each buyer placed the order. Therefore, each buyer is able to benefit from other buyers ordering the same product since the cumulative orders received at the end of the open session determines the price for all buyers placing orders during the open session. If a buyer cancels an order or reduces the quantity of the order, the seller maintains the final aggregate price as to the rest of the buyers. Alternatively, the seller can specify in his terms and conditions that the seller preserves the right to change the pricing structure, which can, in some instances, hold the buyer to a higher price than the buyer had originally agreed to. If the buyer cancels in either of the aforementioned situations, the buyer can be subject to a cancellation or penalty fee at the discretion of the seller. In both situations, when the buyer cancels or changes the order quantity, the cancelled or changed quantity can be immediately made available to the other buyers in the deal room.

However, the final price determined at the close of an open session period will not necessarily be the same for each buyer or group of buyers that participated in the aggregate offer. For example, the buyer and seller can have an agreement in which the seller has agreed that the buyer will not pay above a certain amount, a NOT TO EXCEED (NTE) price, for a product or order. Thus, if the aggregate final price is greater than the contract price between the buyer and seller, the buyer will only pay the agreed upon NTE price. This NTE price can be contracted to be available to an individual order, a predetermined quantity of orders, or any orders placed within a particular time frame. The contract between the parties can further specify that the NTE price can change automatically based upon the length of the relationship between the parties and/or the amount of volume the buyer places with the seller over time. Moreover, an individual buyer's NTE price can remain in effect for the individual although the individual is ordering as a member of a purchasing group.

Another instance in which the final price determined at the close of an aggregate offer can vary for each buyer or group of buyers is when one or more buyers take advantage of coupons and/or discounts offered by the seller. Such coupons and/or discounts can be applied to the aggregate final price, thus allowing the holder of the coupon and/or discount to receive a lower price than other buyers within the aggregate group. For example, a seller can award a discount to an individual buyer within a group for being the most significant contributor to the group's buying power. Thus, the final product price for the group is $4.00, but the price to the individual buyer within the group is $3.50. Coupons and/or discounts can take the form of a percentage off the final price, a pre-negotiated flat fee, step discount prices tied to volume, etc. Coupons and/or discounts will be given for a variety of reasons, such as: the length of the relationship between the buyer and seller; the order volume the buyer has placed with the seller; the seller's need to reduce inventory; the seller's need to sell product more rapidly; and any other reason desired by the seller. For example, if a buyer promises to buy product A from the seller exclusively for one year, the seller can afford the buyer a 5% discount off the final price. As an additional example, if a buyer registers to be part of a particular purchasing group for the next six months, the seller can afford the buyer a 5% discount off the group price.

Figure 2:
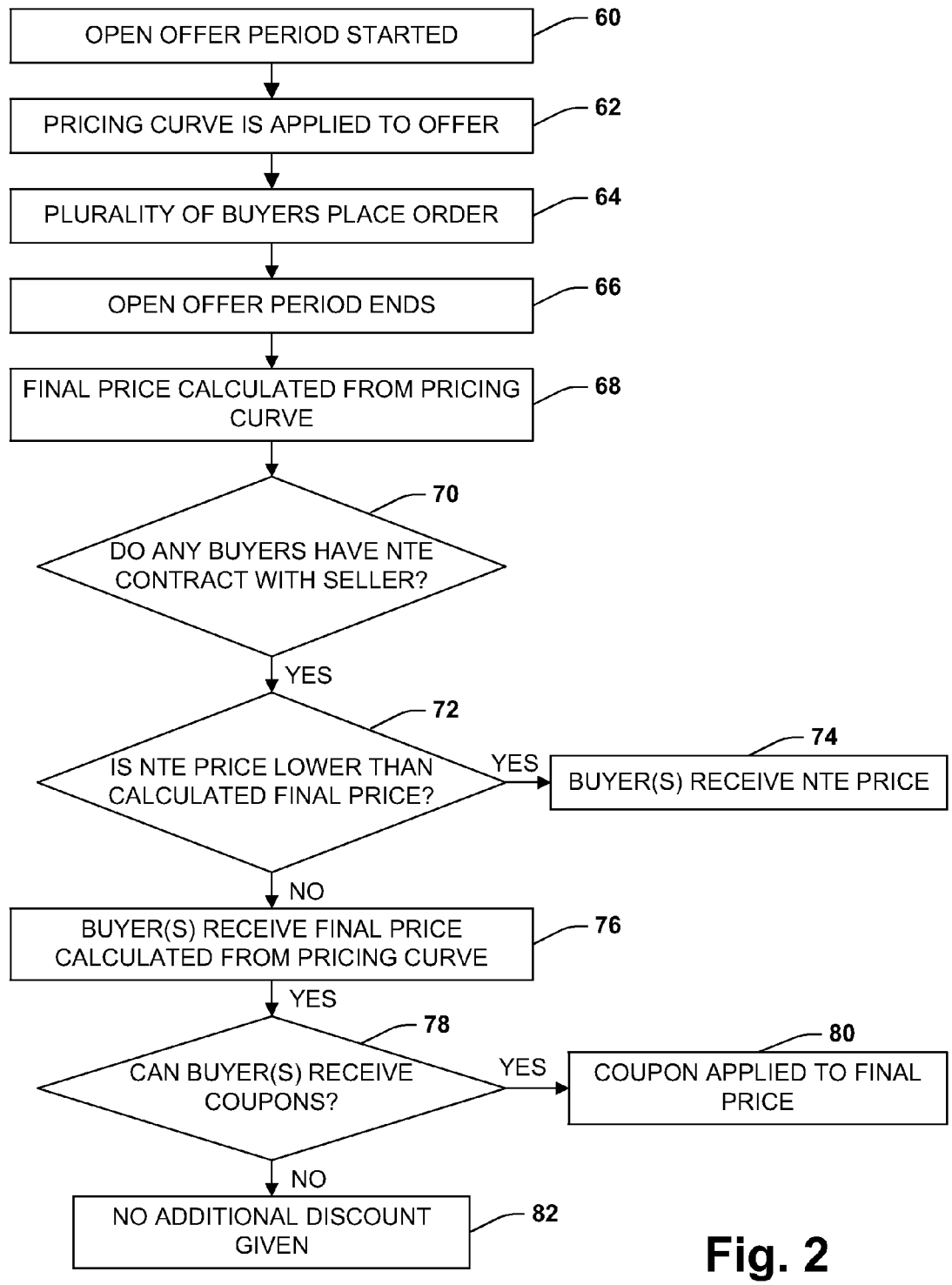
FIG. 2 illustrates a flow diagram for facilitating e-commerce volume pricing in accordance with one aspect of the present invention.

Thus, according to one aspect of the present invention, a volume pricing methodology is shown with respect to FIG. 2.

The method starts at 60 with a seller offering a product or a plurality of products for sale in a deal room during an open offer period. The seller applies a pricing curve to the product at 62 so that the price of the product decreases as more products are ordered. At 64, a plurality of buyers place orders for the product during the open offer period. The open offer period ends at 66. The end of the open offer period may be based upon a predetermined time, available quantity of the product, and/or the seller can choose to close the open offer period prematurely. At the end of the open offer period, a final price is calculated from the pricing curve and is based upon the total quantity of products ordered from all of the plurality of buyers (68).

At 70, the system determines whether any of the plurality of buyers has a NTE price contract with the seller. If yes, at 72, the system determines whether the NTE price is lower than the calculated final price based upon the aggregation. If the NTE price is lower, the buyer(s) will receive the NTE price (74). If the NTE price is higher, the buyer(s) will receive the final aggregated price (76). If the buyers do not have a NTE price contract with the seller, the NTE price determination is skipped. At 78, the system determines whether the buyer is eligible to receive a coupon and/or discount from the seller. If yes, the coupon and/or discount are applied to the buyer's final price (80), the final price being either the calculated price based on the aggregation or the NTE price. Otherwise, no additional discount is given to the buyer(s) (82). Thus, although all the buyers are participating in an aggregated offer for the same product, the final price amongst the participating buyers can be different.

Furthermore, buyers within an aggregate group can be subject to different pricing structures, or price curves, for the same product. For example, a seller can access information about the buyers past purchasing history, such as the number or percentage of cancelled orders, on-time payments, and/or the number of orders the particular buyer has placed through the system. This information can be viewed in terms of the buyer's history with that particular seller, all sellers, that particular product or product category, or all products. Based on these criteria, a ranking is assigned to the buyer either manually or by default criteria set by the seller. This ranking can then determine the pricing structure that the buyer receives for a particular product. For instance, a buyer with a 100% rate of taking receipt of all orders online and 100% of paying within 30 days would be assigned a high ranking of AA. When this buyer returned to the site and entered a password, the AA rating would be denoted and a certain pricing structure would be made available to that buyer for placing an aggregate order. Likewise, a buyer with a low CC ranking could see a pricing structure with a 5% premium, simply based on their password and past performance. Additionally, a buyer can be grouped into a specific pricing structure according to the buyer's current or historical product volume consumption. Generally, a buyer within an aggregate group will only have access to view the pricing structures applicable that individual buyer, and not to other buyers within the same group. Movement between groups is possible for individual buyers upon achieving different ratings and/or volume consumption.

Figure 3:
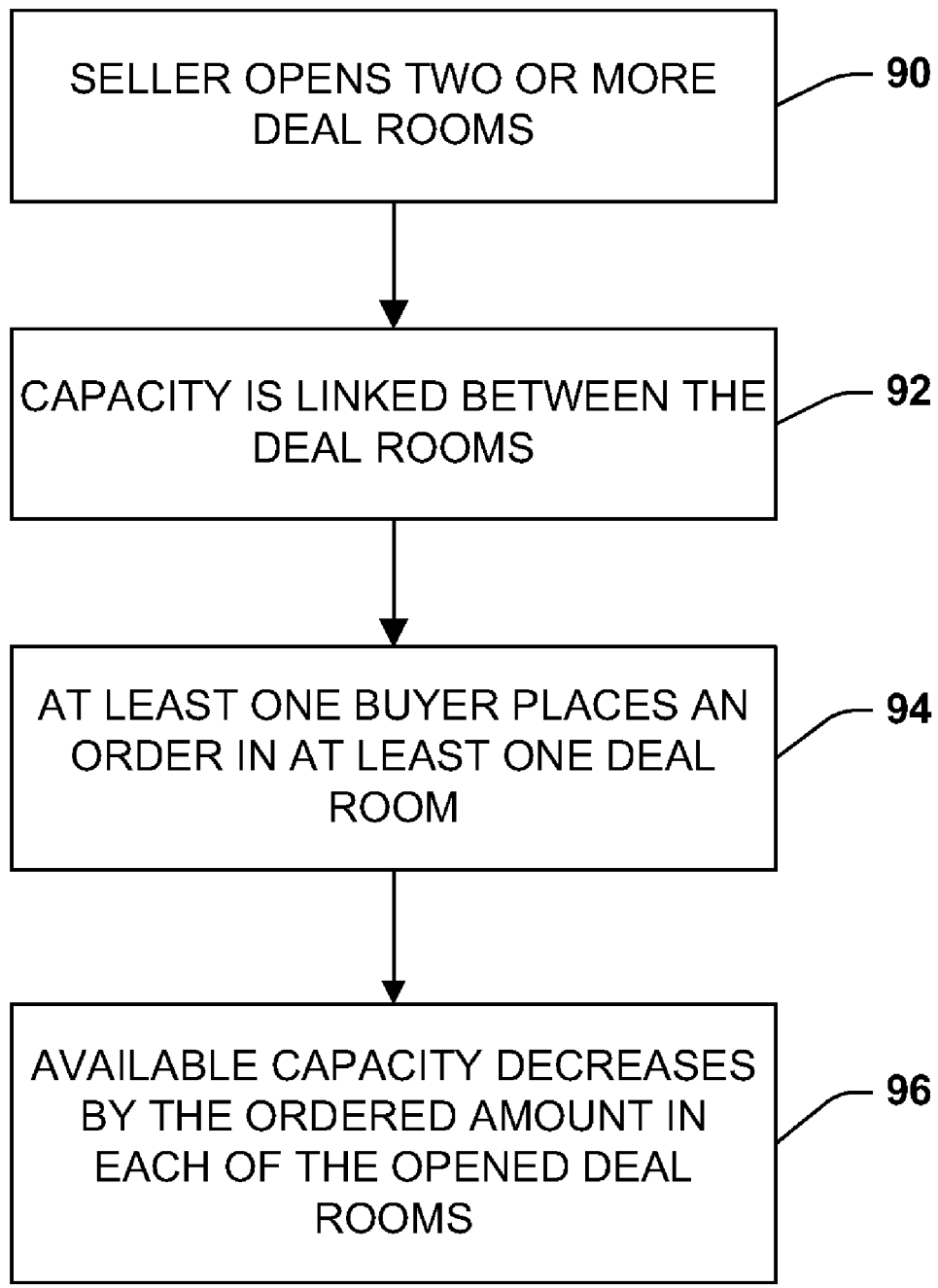
FIG. 3 illustrates a flow diagram for linking deal rooms in accordance with one aspect of the present invention.

One method of achieving the aforementioned pricing strategy is shown with respect to FIG. 3 and involves a seller having two or more deal rooms with open offers for the same product. Deal rooms provide a convenient forum for sellers to receive orders from multiple buyers during an open session period and will be described in further detail later. Each individual deal room has a different pricing structure and only authorizes access to buyers meeting predetermined criteria specified by the seller. At 90, a seller opens two or more deal rooms, each deal room offering the same product, but having a different price curve. At 92, the seller structures each of these deal rooms so that the available capacity is shown in full in each of the deal rooms and is linked between the deal rooms. At 94, at least one buyer places an order in at least one of the deal rooms. Since the capacity is linked between the deal rooms, the available quantity of product falls by the ordered amount in each of the opened deal rooms (96). For example, a seller plans to produce 5000 pieces of product A. The seller opens deal room 1 and deal room 2 and establishes both deal rooms as having 5000 pieces of product A available. If a buyer in deal room 1 purchases 1000 pieces of product A, both deal room 1 and deal room 2 show the available quantity of product A as 4000 pieces. Since the pricing structures within the different deal rooms are different, an order can reduce the price by 10% in one deal room and by only 5% in another deal room.

Alternatively, the seller can divide the capacity between the two deal rooms. Thus, in the example above, if the seller plans to produce 5000 pieces of product A, the seller can configure both deal room 1 and deal room 2 with 2500 pieces of product A. Thus, if a buyer places an order for 1000 pieces in deal room 1, the available quantity in deal room 1 becomes 1500 pieces, and the available quantity in deal room 2 remains at 2500 pieces. However, buyers participating in both deal rooms are still afforded the advantage of the demand aggregation on 5000 pieces. Throughout the open offer period, the seller maintains the ability to modify various aspects of the offer as deemed necessary. In the last example, if the seller is receiving significantly more activity in deal room 1 than in deal room 2, the seller can reduce the available capacity in deal room 2 by 1500 pieces and add that 1500 pieces to deal room 1. Thus, changing the available quantity in deal room 1 to 3000 pieces and the available quantity in deal room 2 to 1000 pieces. Similarly, the seller can opt to close deal room 2 prematurely and apply the entire available capacity to deal room 1. Sellers are only limited in their modification rights to the extent that any of the buyers would be disadvantaged. Furthermore, any modifications made to a deal room is done in real time; thus, allowing buyers to view the most up to date information at any time.

Two or more sellers of the same product can also utilize the aforementioned method of employing multiple deal rooms with multiple pricing structures. For example, both a manufacturer and a distributor can be engaged in selling the same products through the system. Since the manufacturer is supplying the distributor with the products, the manufacturer will realize production efficiencies in aggregating product volume between the both the manufacturer's deal rooms and the distributor's deal rooms. Thus, all parties involved in the transaction will realize cost benefits.

Moreover, a manufacturer and a distributor of the same product can take advantage of an auto post feature in the system. This feature will immediately post an open offer in the distributor's deal room upon the manufacturer posting an open offer in the manufacturer's deal room. This process includes a distributor receiving a list of products that will be offered in the deal room by the manufacturer. This list is tagged by the distributor to have these products automatically populate in the distributor's deal room along with the requisite lead-time (e.g., a three day difference) between the distributor's receipt of the product and the ship date posted to the buyers.

The distributor can also specify the price breaks to be added above those provided by the manufacturer (i.e., a starting price of $65/1000 pieces submitted by the manufacturer shows as 125% of that price/same volume to the distributor's customers). The figure applied can be a multiple (1.25), a percentage (125%), set price ($85), etc. along with the requisite price breaks or a flat price and all other information. The system provides the benefit of automatically posting open offers downstream from one deal room to another. Likewise, there can be multiple segments within one deal room based on different customer segments. For example, upon a manufacturer posting an offer in a deal room, three different deal rooms can open for the distributor for three different groups of buyers. The first deal room can specify 125% of the manufacturer's price and a lead-time of three days from the manufacturer's ship date; the second deal room can specify 110% of the manufacturer's price and a lead-time of three days from the manufacturer's ship date; and the third deal room can specify 105% of the manufacturer's price and a lead-time of two days from the manufacturer's ship date. In addition, or in the alternative, other features can also be varied within the different deal rooms, such as pay options and product options. It is to be appreciated that the auto post feature can be used by a plurality of sellers with related products and is not limited to a manufacturer and distributor relationship.

The feature described above can also work in the opposite direction with a distributor placing an order that triggers a single or aggregated offer from a manufacturer. For instance, a distributor in a family of regionally dispersed distributors has an order for 10,000 units of a product that is needed in five weeks. The distributor can request this order be an aggregated offer posted to the rest of their divisions/deal room participants for aggregation. An open offer is triggered by this request with any price breaks that have been predetermined by the manufacturer. The manufacturer can have an automatic check feature, which can check if the offer is already posted and alert the distributor. The automatic check feature can also check to see whether the offer is within a time frame specified by the manufacturer, whether any options are included in the offer, whether capacity is available to post the offer. Furthermore, a message can be sent directly to the manufacturer's messaging system for a confirmation request before it is posted as an open offer.

Once this open offer is posted, it will automatically have the requested amount specified by the distributor baseloaded within the offer, and other distributors are notified of the purchasing opportunity. Another offer can automatically populate in the distributor's deal room for their buyers as well. Moreover, the manufacturer can request that another open offer be created in a different deal room at a different pricing structure. For example, a large distributor with access to the trigger functionality requests and posts automatically an aggregated offer from a supplier. This open offer is then baseloaded with the order and presented to the rest of the buyers within that section of the deal room. As more buyers order, the price drops accordingly. The trigger function automatically populates a second open offer to other deal rooms provided by the manufacturer. The pricing structures and quantities can be predetermined in the system and can be changed at any time. A confirmation function can be engaged which requests that the manufacturer validate the option of posting the offer in another deal room.

Buyers also have the ability to rank the performance of any sellers with whom they have transacted. Sellers can be ranked on criteria such as, on-time delivery, quality of goods, communication, and response time to Requests for Quote (RFQ), Requests for Offers (RFO), and Requests for Product (RFP). Both buyers and sellers can allow other buyers and sellers to view their respective rankings In addition, buyers and sellers are afforded the opportunity to leave feedback to a buyer or seller in response to a transaction between the parties. Such feedback can be available to the entire user community, thus affording a new buyer the opportunity to view a particular seller's on-time delivery history prior to placing an order with that seller.

An aggregate offer can have a fixed minimum order quantity or a variable minimum order quantity. In an offer that contains a variable minimum order quantity, a seller can fluctuate the minimum quantity that an individual buyer must order as the total aggregate order changes. For example, an offer can be established to automatically decrease the minimum order quantity from 500 pieces to 100 pieces as soon as the total aggregate order quantity reaches 5000 pieces. Then again, an offer can be created in which no minimum order quantity is required; however, the seller retains the right to cancel the entire order if the quantity does not reach a predetermined level by a specified date and time. Minimum order quantities can be specified per shipping location. This allows sellers to take advantage of shipping aggregation for different ship points.

The system also has the ability to automatically suggest or create offers based on history or user specifications. These offers can be time or quantity dependent. For example, the system automatically opens an offer for a specified product every two weeks or every time 1000 units of a product are ordered, the order closes and a new order for that product is opened. Offers can also be created automatically based upon a purchasing agreement between a buyer and seller for guaranteed acceptance of product orders throughout a predetermined time period. Thus, the seller can post planned inventory in advance. For example, if a buyer agrees to accept shipment of 100 racks of glass the first week of every month for the next six months, the seller then posts the availability of an additional 50 racks of the same glass for the same week. The original buyer provides a base that absorbs much of the fixed costs associated with the schedule while the incremental 50 racks represents proper capacity utilization at much higher profit margins.

Buyers have the ability to create conditional orders for a product. Conditional orders are created, for example, when a buyer agrees to place an order if the price drops below a specified level or if the aggregation reaches a certain percentage discount. If, or when, the condition is met, the buyer's order will be automatically placed by the system. Furthermore, the system will recognize when two or more conditional orders can be combined to perfect the condition and thus, place these orders. For example, buyer 1 wants to buy X units of a product if it falls below $5 and buyer 2 wants to buy Y units of the same product if it falls below $5. If quantity X plus quantity Y plus any quantity currently on order is enough to bring the price below $5, both buyer 1's and buyer 2's orders will be placed.

In view of the foregoing features described herein, exemplary web pages in accordance with various aspects of the present invention will be better appreciated with reference to FIGS. 5-10. It is to be understood and appreciated that the present invention is not limited by the illustrated order of these web pages, as some aspects could, in accordance with the present invention, occur in different orders and/or concurrently with other aspects from that shown and described herein. Moreover, not all illustrated features on the web pages may be required to achieve the advantages of the system in accordance with an aspect the present invention.

Figure 4:
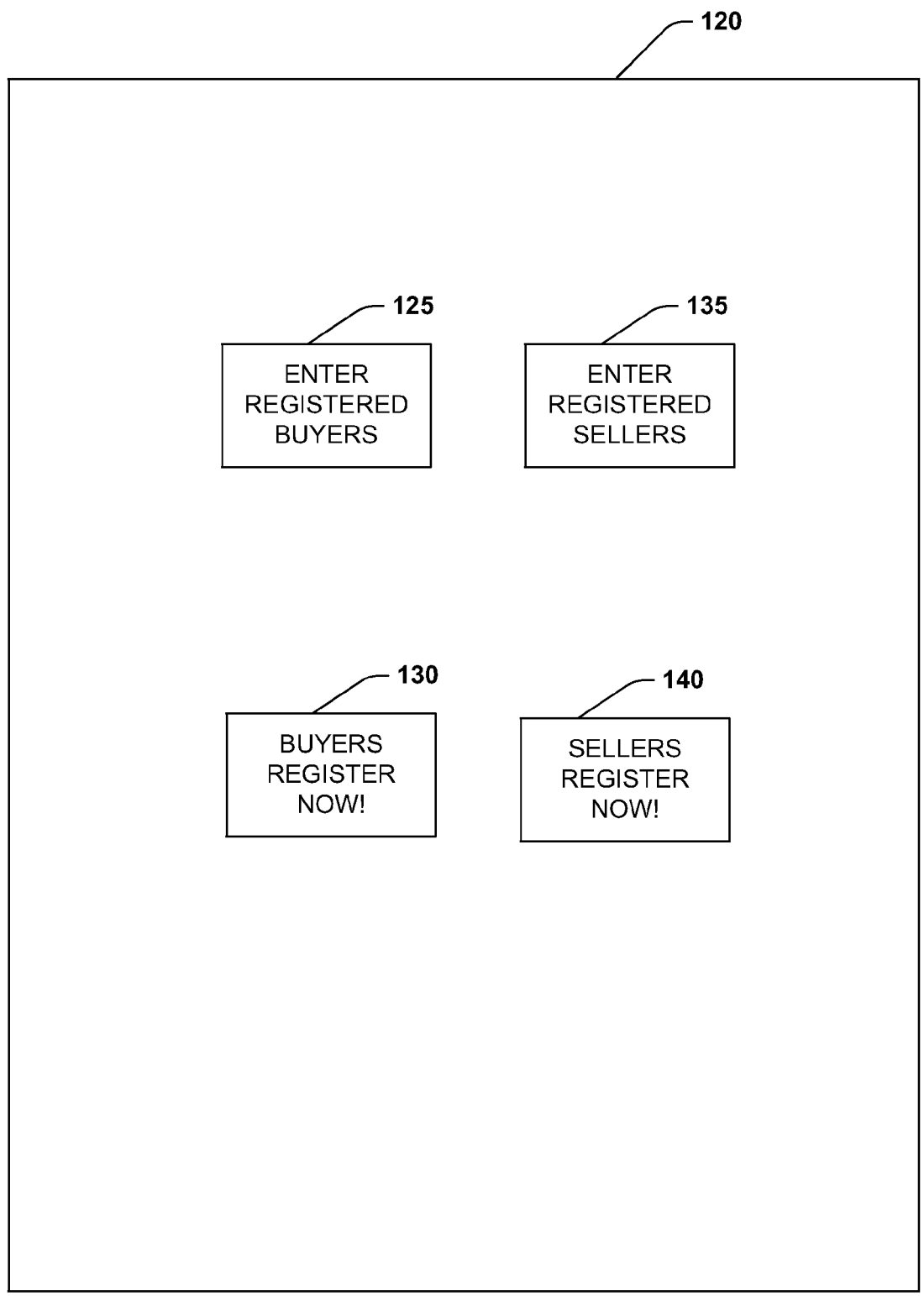
FIG. 4 illustrates a web page providing options to buyers and sellers desiring to conduct business electronically in accordance with one aspect of the present invention.

Turning now to FIG. 4, an exemplary Internet web page 120, which provides buyers and sellers with access to a forum for conducting business, is shown. The web page 120 includes hyperlinks for handling both registered and un-registered buyers and sellers of products. For example, registered buyers can select a hyperlink to a registered buyer login screen via hyperlink 125 while non-registered buyers can select a hyperlink to a non-registered buyer registration screen via hyperlink 130. Similarly, registered sellers can select a hyperlink to a registered seller login screen via hyperlink 135, while non-registered sellers can select a hyperlink to a non-registered seller registration screen via hyperlink 140. While separate hyperlinks are shown for buyers and sellers, it will be appreciated that such hyperlinks could alternatively be combined and the status of buyer or seller could be determined during a later stage in the login procedure.

Figure 5:
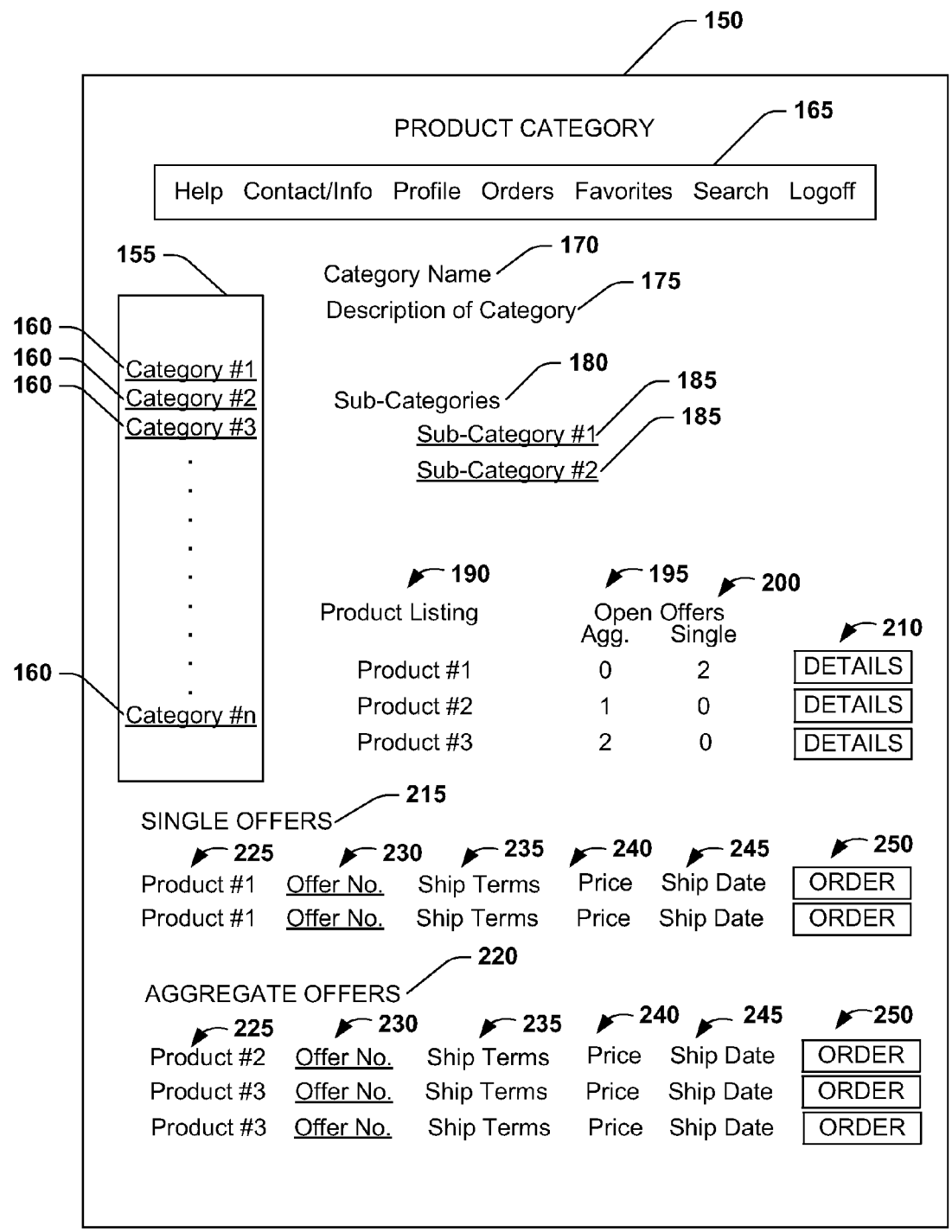
FIG. 5 illustrates a web page providing options to buyers desiring to conduct business electronically in accordance with one aspect of the present invention.

Turning now to FIG. 5, in accordance with one aspect of the present invention, an exemplary product category web page 150 is shown. Included on this page is a category menu 155, comprising hyperlinks 160 to other product category web pages. The web page 150 also includes a general pull down menu 165, which allows a user to perform such functions as: find help on a particular topic; contact the seller and/or the web page host; update and/or view the user's profile, which includes details such as, the user's login name and password, company information, shipping information, billing information, and any special instructions; view past orders and/or current orders; view and/or edit the favorites menu; search for products, buyers, sellers, etc.; and log out of the system. The product categories menu 155 and the general menu 165 can be included on each web page for ease of navigation throughout the system.

The product category page 150 includes the category name 170 and a brief description of the category 175. A list of the product's subcategories 180, if available, is shown with hyperlinks 185 to each of the product subcategory's pages (not shown). The product subcategory page is similar in structure and content to the product category page 150. A section containing a summary of products available under the product category is shown. This section includes information such as, the name of the product 190, whether the product has any open offers, aggregate 195 or single 200, how many open offers are available for each product, and a hyperlink 210 to the product details web page. If any open offers exist for this particular product category, a section with a summary of the open offers will be shown. This section can be split into a summary of the open single offers 215 and a summary of the open aggregate offers 220. This open offer summary includes information such as: the product name 225, a hyperlink 230 to an offer details web page, the shipping terms 235, the price 240, the shipping date 245, and a hyperlink 250 to a seller sponsored deal room. Shipping terms are included in both single and aggregate offers and are typically Free On Board (FOB) terms. However, other shipping terms can be provided, such as FAS, CIF, C&F, or any other applicable shipping term. The hyperlink 250 to the supplier sponsored deal room allows a buyer to place an order in connection with one of the offers.

The product categories menu 155 can also link the user to a catalog (not shown). The catalog can be viewed and arranged by product type, by seller, and/or by pricing. Sellers have the option of blocking access to any or all of their product listings from specified system users. Sellers can also create custom templates for ease of adding a new product listing. A default template is also available by the system host for this purpose. The product listings in the catalog contain details about each product, including the manufacturer/distributor, default pricing and/or price curve, any available options and/or customizations, minimum order quantities, ship terms and links to related products. The catalog can also be accessed through alternate means, such as the search function, the favorites menu, the user's homepage, etc.

Figure 6:
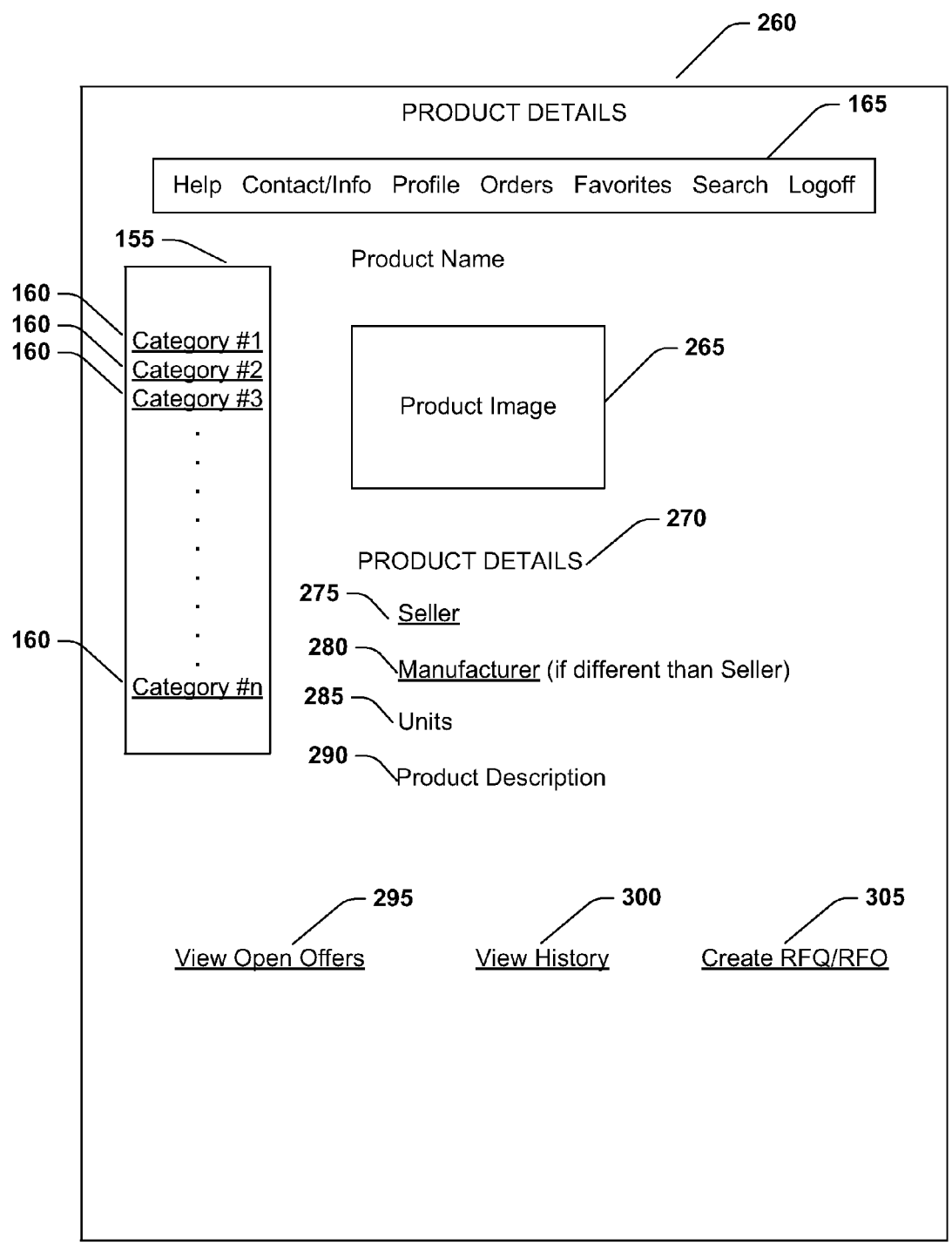
FIG. 6 illustrates a web page in which details for a product are displayed in accordance with one aspect of the present invention.

An example of a product details web page 260 is shown in FIG. 6. Here an image of the product 265 is shown along with details 270 that can be important to a buyer when determining whether to purchase the product. Included in these product details 270 are: the name of the seller, with a hyperlink 275 to a seller details page (not shown); the name of the manufacturer, if different from the seller, with a hyperlink 280 to a manufacturer details page (not shown); unit description 285 (e.g., pieces, feet, inches); and a description of the product 290, which can include details not readily apparent by the image shown. The seller details page and the manufacturer details page can include information such as: the name, address, and contact information of the seller and/or manufacturer; other products available by the seller and/or manufacturer; feedback from other buyers and/or sellers; and any open offers currently available from the seller and/or manufacturer. Also included on the product details page is a 'View Open Offers' hyperlink 295 to view offer details of any open offers for the product and a 'View History' hyperlink 300 to product history web page (not shown). The product history page can show details and/or summaries of the product history, such as, when the product was introduced to the system, how many times the product has been ordered in the past, on what dates, and in what quantities, the average cost of the past orders, how many buyers participated in the offers, and when the next open offer is anticipated. A 'Create RFQ/RFO' hyperlink 305 is provided to direct buyers to a page, which will allow them to request a quote or offer for the product in the event that there are no open offers for a product or the current open offers do not meet the buyer's needs (e.g., shipping date, quantity, options).

Figure 7:
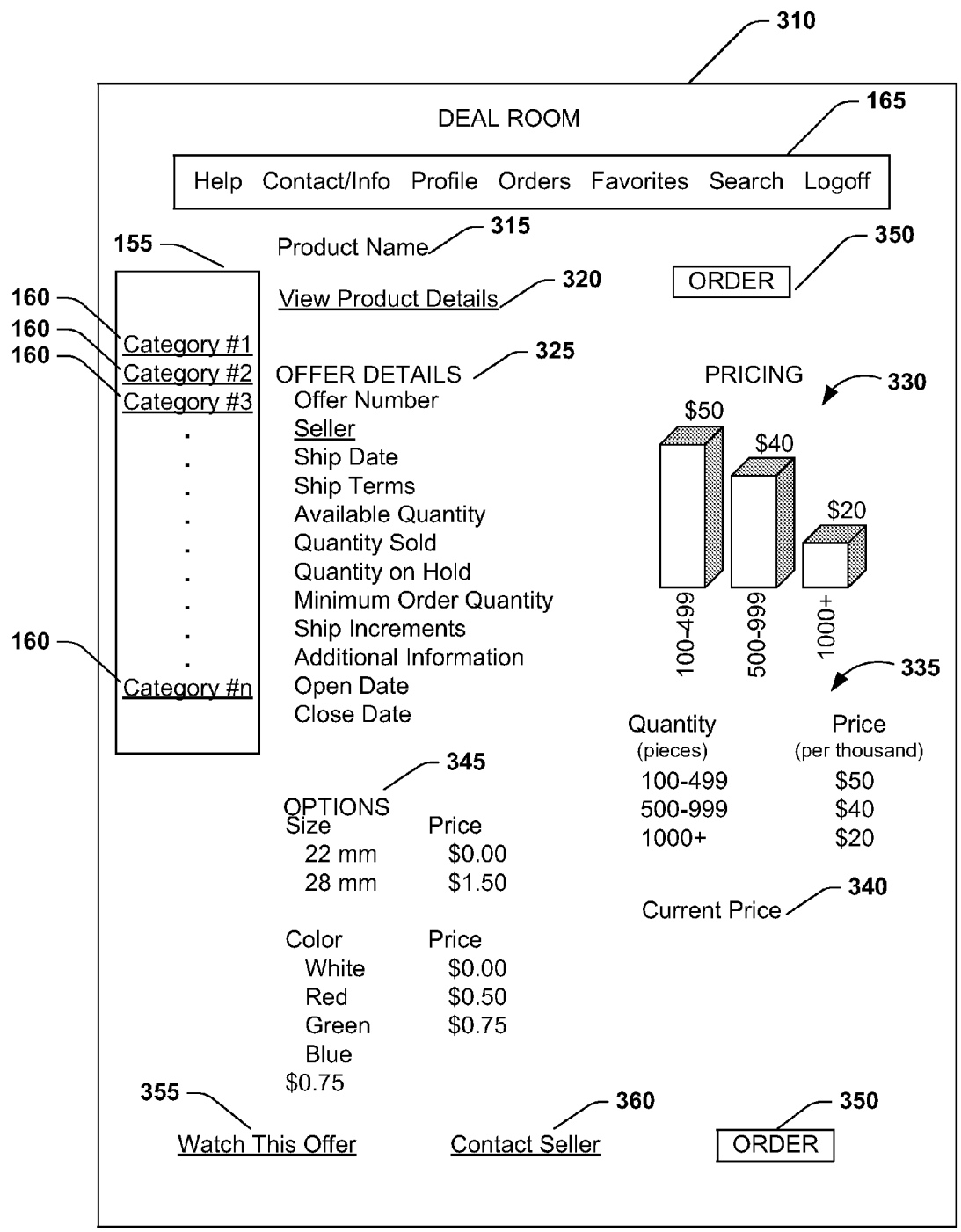
FIG. 7 illustrates a deal room in which buyers may place electronic orders for products posted by sellers in accordance with one aspect of the present invention.

Turning now to FIG. 7, in accordance with one aspect of the present invention, deal rooms are set up in which buyers are able to view the details of an open offer and order products in connection with the open offer. The deal room includes the product name 315 and a hyperlink 320 to the product details web page. Also included in the deal room is an offer details section 325, which contains information such as: the offer number; the seller, with a hyperlink to the seller details page; the ship date or ship date range; the ship terms; quantity available; quantity sold; quantity on hold; minimum order quantity; ship increments; offer open date; offer close date; and any other additional information given by the seller. The minimum order quantity can be fixed or it can change with the current ordered volume against an offer. The pricing for this offer is displayed in both a graphical format 330 and a table format 335. The current price 340 for the product, based upon the quantity of parts currently on order, is shown in real time. The current price is based on a base product without any custom options. If options are available for the product, they will be shown in an options section 345. In this example, options for product size and product color are offered. Any price increase or decrease is shown with respect to each option. For example, if the product has a standard blue coating, the option to have a yellow coating increases the cost to the buyer by $2 per 1000 pieces. However, if the buyer opts to order the product without any coating, the cost decreases by $8 per 1000 pieces. Thus, a seller could configure the deal room to show different price curves for each of the different product options. Furthermore, different deal rooms for the same product can be configured to provide different available options for the different buying groups.

Based on the above information, if a buyer desires to place an order, the buyer selects an 'order' icon 350, displayed within the deal room, to continue the purchasing process.

Alternatively, if the buyer is interested in the offer, but does not yet wish to place an order, the buyers can select a 'watch this offer' hyperlink 355 displayed within the deal room. The offer can then appear on a web page, such as the buyer's homepage, in which all of the buyer's watched offers will be displayed. Moreover, the system can be prompted to notify the buyer of any activity that can occur with respect to that particular offer. Furthermore, if the buyer has any questions about the offer, the buyer can choose the 'contact seller' hyperlink 360. This hyperlink 360 will direct the buyer to the seller's email, or messaging, screen.

Figure 8:
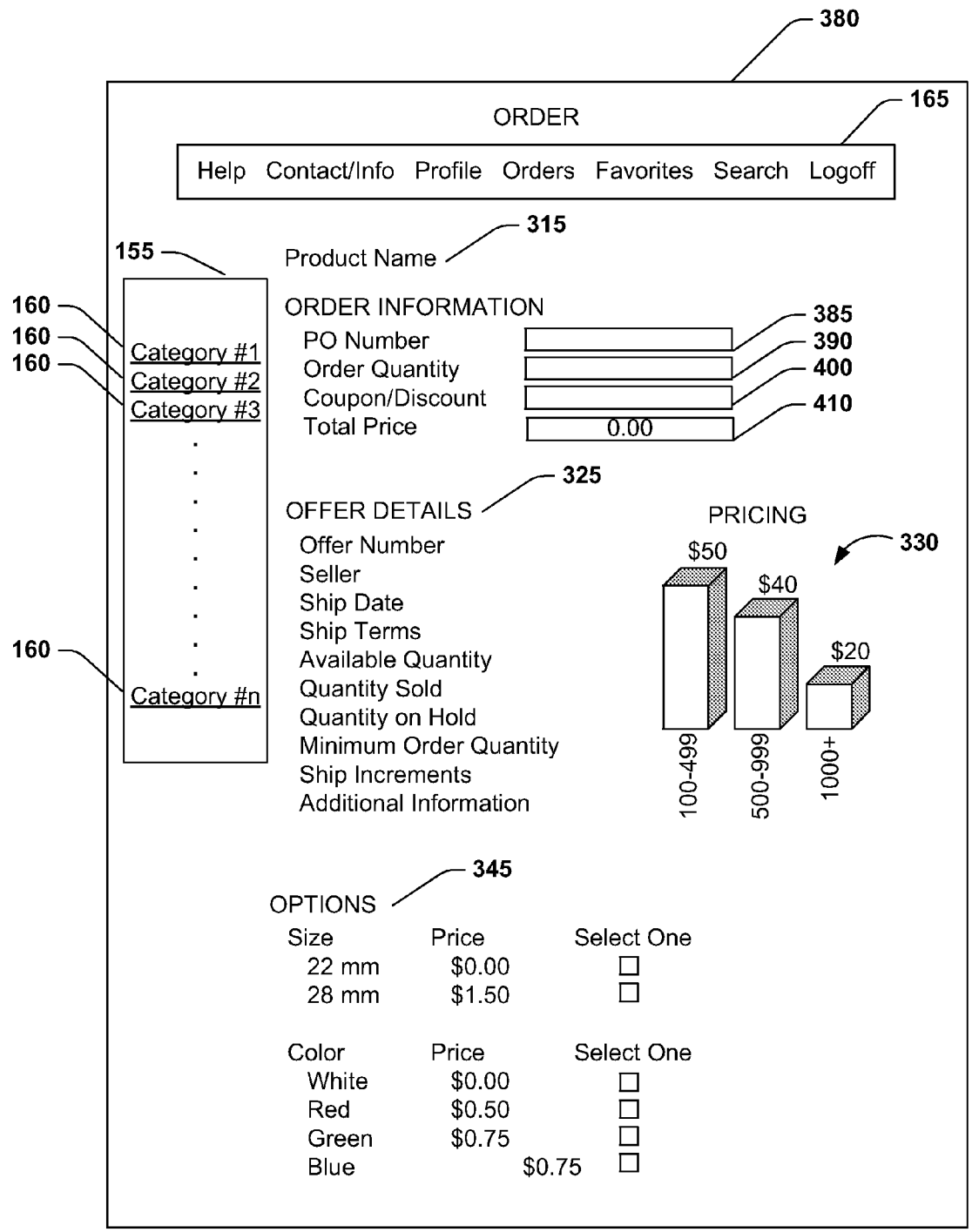
FIG. 8 illustrates a web page for a buyer to place an order for a product in accordance with one aspect of the present invention.

If the order icon is selected, the buyer is then directed to an order web page 380, as shown in FIG. 8. This page references the offer in which the buyer is interested. Here the buyer enters information required by the seller to fulfill the order. Such information includes: the buyers purchase order number 385, the quantity required 390, product options 345, if available, and billing and shipping information 395 (FIG. 9). Upon entering an order quantity, the system can prompt the buyer with a message alerting the buyer of an additional discount if the order quantity is increased. Such a prompt can also appear when the buyer is ready to confirm his/her order. The prompt can include 'yes' and 'no' icons so that if the buyer chooses 'yes', the system will automatically increase the buyer's order quantity and calculate the new unit price and overall price. If the buyer chooses 'no', the prompt will disappear and the buyer can continue with the order process. Furthermore, system prompts, such as this one, can be turned on or off according to the buyer's preferences.

The order page also contains an entry field 400 for a coupon or discount code. These codes are uniquely recorded by the system, thus providing that the buyer will not use the coupon or discount more than intended. Coupons or discounts can expire based on the number of times used, the date, and/or the order quantity. The system also supports an accruing discount function. This allows sellers to offer automatic discounts to buyers who achieve purchasing milestones. The number of units purchased, total dollar volume, total orders placed, and/or total time spent buying online can specify these milestones. Similarly, an entry field 405 for a gift certificate or merchandise credit code is provided on the order page (FIG. 9). If the buyer does not wish to use the entire gift certificate or merchandise credit amount for the order, the buyer can specify the dollar amount that he/she wishes to use for the order. Based upon the current product price, the quantity ordered, what options are selected, and whether any discounts or coupons have been used, the total price field 410 will automatically populate with the buyer's total order price. The buyer can also add any additional instructions, including shipping instructions, for the seller.

Once the buyer has completed the order entry, the buyer selects a 'continue' icon 415. At this point, if the system determines that the buyer is not logged in, the system will require the buyer enter a login name and password, or alternatively, complete a registration process, such as that shown in FIG. 10. In the present example, the registration form 420 requests that the buyer enter the following information: buyer name; address; primary contact person; phone; fax; e-mail; short description of company; preferred login user name; and preferred password. With respect to the user name and password, the processing unit 64 is configured to determine whether the selected user name and password combination are available and, if not, to prompt the buyer to enter a new user name and password until an available combination is selected.

If the buyer is registered and logged into the system, he/she will be directed to an order confirmation page (not shown).

Here the details of the order are shown and the buyer has the option of confirming, modifying, or canceling the order. If the buyer confirms, the order is placed with the seller or the order is sent to a shopping cart. Shopping carts can be seller specific. Thus, the buyer can have more than one shopping cart active simultaneously. It is to be appreciated that shopping carts can also be organized by product category. Moreover, the buyer can only have one shopping cart active that contains all orders made by the buyer. Shopping carts will typically be emptied once a buyer logs out of the system. However, a buyer has the option of saving the shopping cart for later verification. While orders are active within a shopping cart, the deal room can show the order quantity as on hold. Line items within the shopping cart based upon offers that have already closed will be considered invalid and ignored by the system. A shopping cart can also be created to save quotes received from a seller.

However, the system can determine that the order cannot be confirmed. An alert system can be employed to notify the buyer that the order, as placed, exceeds the buyer's authority. This can occur if the buyer is configured within the system to have limited purchasing authority. For instance, the buyer may only be permitted to order specified products, to remain within an account spending limit, and/or to not exceed a certain dollar amount per order. The buyer's supervisor, the seller, or any other user with appropriate authority can place such limits. The system can automatically cancel the order, alert the buyer to edit the order, or to forward the order to the seller or a supervisor for authorization if the buyer exceeds his authority. If the order is awaiting authorization, the system will hold the order for a predetermined time period. Thus, the quantity available will be reduced for other buyers. The other buyers may be aware of the quantity being held, but they will not have access to the identity of the buyer for whom the product is being held. If the order is cancelled, the hold quantity is released and made available again to the other buyers.

Figure 11:
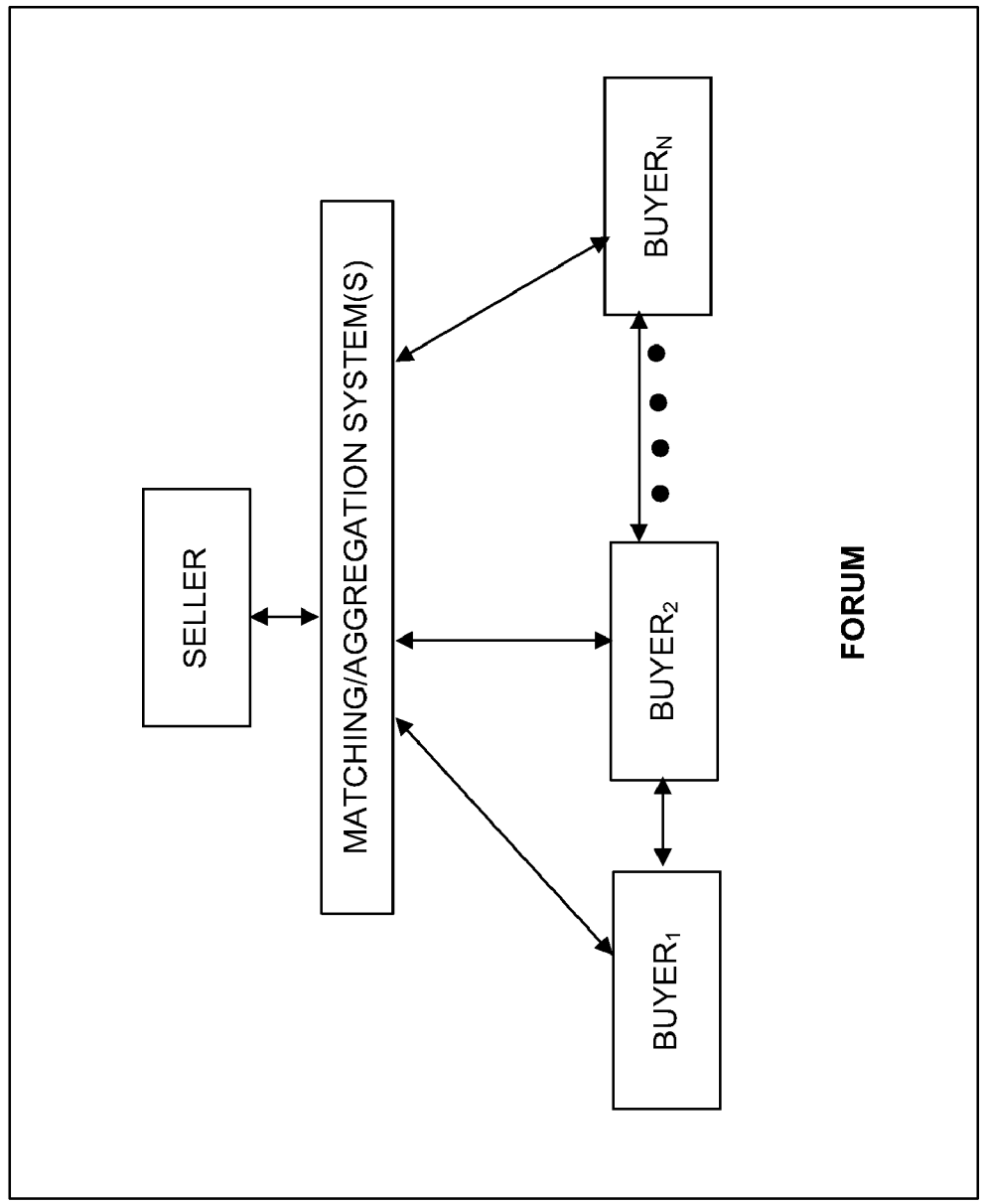
FIG. 11 illustrates a seller sponsored transaction in accordance with one aspect of the present invention.
Figure 12:
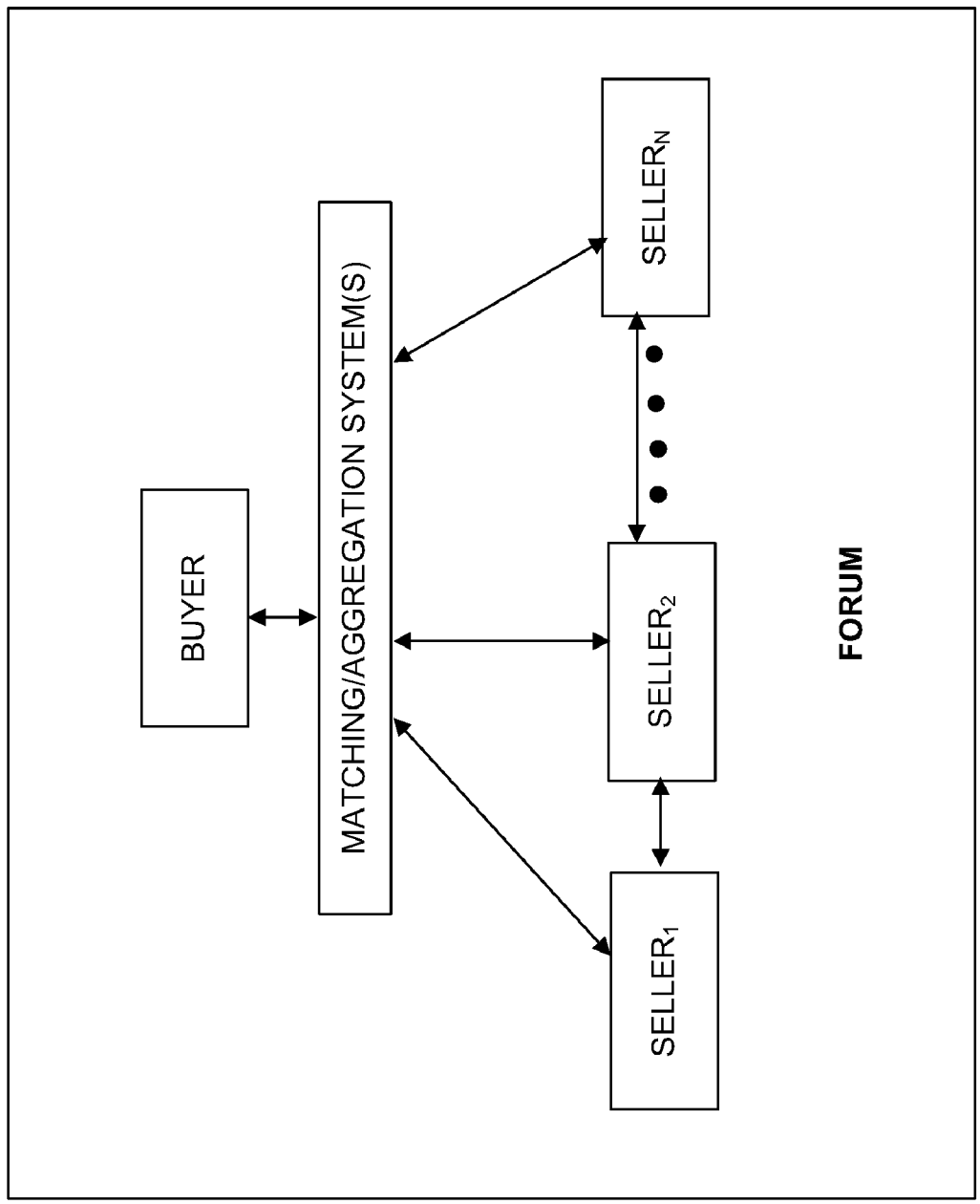
FIG. 12 illustrates a buyer sponsored transaction in accordance with one aspect of the present invention.

Regarding FIG. 12, although the present invention has been largely described within the context of a seller sponsored deal room (FIG. 11), it is to be appreciated that a buyer or buyers can sponsor a deal room to aggregate purchasing goods/services from a plurality of sellers. For example, a large corporate buyer can employ the present invention to create a deal room where a plurality of sellers can assemble to aggregate selling of specific goods and/or services that the buyer desires. Such a transaction facilitates the buyer satisfying purchase requirements in one forum and to coordinate deliver of goods/services. Furthermore, such a system facilitates sellers making sales to the buyer, which but for the sellers being able to aggregate the buyer may not have dealt with the individual seller because of insufficient capacity to meet the buyers needs. The subject specification describes exemplary systems and interfaces for implementing the subject invention, and therefore further discussion thereto is omitted for sake of brevity. However, it is to be appreciated that one skilled in the art based on the above discussion regarding seller sponsored deal rooms/transactions could apply such teachings to implement the aforementioned buyer sponsored deal room/transaction.

Figure 13:
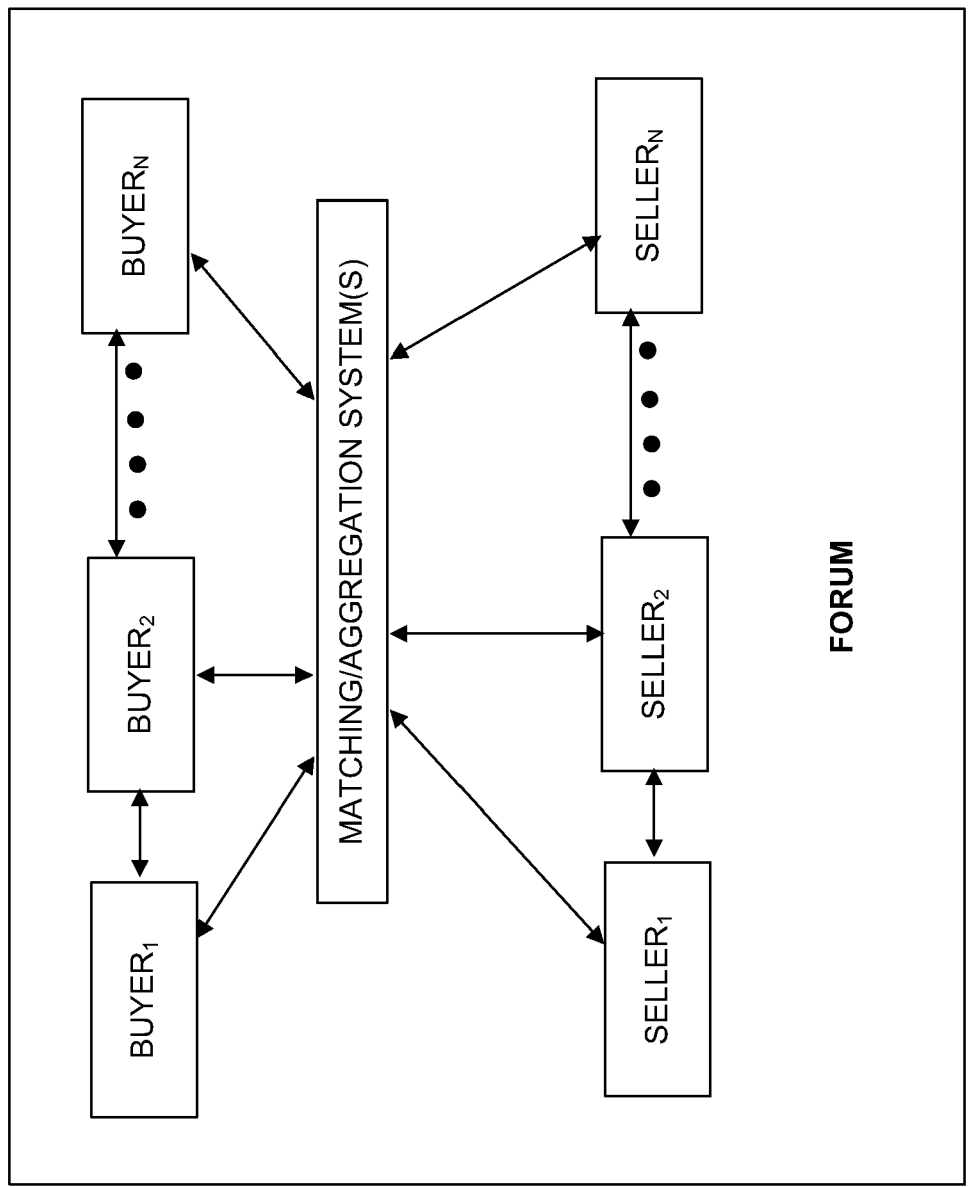
FIG. 13 illustrates a multiple buyer and multiple seller sponsored transaction in accordance with one aspect of the present invention.

Regarding FIG. 13, although many aspect of the present invention have been largely described within the context of a seller sponsored deal room/transaction; it is to be appreciated that buyers and sellers can concurrently sponsor a deal room/transaction to aggregate selling of and purchasing of goods/services by a plurality of sellers and buyers respectively. For example, a multiple sellers and buyers can employ the present invention to create a deal room/transaction forum where a plurality of sellers and buyers can assemble to aggregate selling and buying of specific goods and/or services that the sellers wish to sell and the buyers desire to purchase. Such a transaction forum creates great efficiencies with respect to purchase price and/or selling quantity of particular goods/services. For example, in such a forum dedicated to the selling and purchasing of a specific product/service, sellers can assemble to compete for the sale of their respective product/service, which leads to pricing efficiencies. Buyers can assemble in such a forum to aggregate buying power in order to negotiate good prices and close deals. Sellers on the other hand can also aggregate to meet the needs of a large buying block. The subject specification describes exemplary systems and interfaces for implementing the subject invention, and therefore further discussion thereto is omitted for sake of brevity. However, it is to be appreciated that one skilled in the art based on the above discussion regarding seller sponsored deal rooms/transactions could apply such teachings to implement the aforementioned buyer sponsored deal room/transaction.

The users and groups module is capable of storing users, groups, and their details, such as demographic and marketing information. For example, a buyer is presented with a catalog item to determine whether the buyer would be interested in purchasing that item, and if so, when they would next need the item and at what quantity. This information could then be used to suggest or automatically create aggregate or single offers. Users are virtual representations of the physical users of the system and/or remote systems, such as corporate purchasing servers or sales-processing servers. Groups are collections of users with specific system roles and/or rights. For example, a seller group can be granted the right to manage a particular access group and a buyer group can be granted access to a particular set of offers and the right to place orders on particular products. Furthermore, groups can be offered different pricing structures and/or product quantities than individual users for a particular product. Groups can be contained within other groups, thus creating parent-child relationships. In these relationships, child groups inherit access permissions from their respective parent groups. The system host or administrator, the seller, or the individuals within the group can determine the makeup of the groups. Although the descriptions and examples herein commonly refer to transactions between an individual buyer and an individual seller, it is to be appreciated that such transactions can also occur between one buyer and a group of sellers, a group of buyers and a group of sellers, or a group of buyers and a group of sellers.

Both users and groups are identified by a login name and password, which are chosen by the users and groups upon registration. Passwords can be stored using MD5 encryption. MD5 uses one-way functions rendering it impossible to generate the password from knowing only the MD5 hash of the password. Therefore, users and groups will be prompted to choose a question and answer pair that will be used to identify a user or group in the event that the password is forgotten. Users and groups can choose to associate identifying characteristics to their login identity, such as a company name, shipping address, billing address, company logo, and/or biography. Some or all of this information can be required if the user and/or group chooses to buy and/or sell a product.

The access control module allows item creators to specify a set of rules, or permissions, as to who can access, modify and/or use the items, wherein the term item is used to denote categories, products, offers, etc. Read permissions allow users or groups to see, but not edit, item information. Edit permissions allows users the ability to make changes to the item, as well as, to the access control information relating to that item. Relate permissions are used to give a user the ability to create parent/child relationships among items; for example, the ability to create a derived product, an offer, or to place a product in a category. Place order permissions enable one to place an order on an offer or to use a line of credit/account to place an order. System administrators, or other similarly privileged users, have override permissions, which enable them to make modifications without being subject to edit rules. Override permissions can be global or specific. Global override permissions enable one to override all edit rules anywhere on the system, while specific override permissions enable one to modify data pertaining to specified, limited areas of the system.

The messaging module includes the ability for the system to communicate with users and other integrated systems. Users are notified of any change that occurs in an offer that they are involved in, such as a price change, an opportunity for further discount, change in shipping terms, and/or when the offer has been closed. Users can also request to be notified of similar changes in offers that they are interested in but have not yet participated. Likewise, users can request to be notified if any activity occurs on a particular product or product category, such as an additional options available for a product, new products offered within the category, new open offers, RFQs, RFOs, RFPs, and/or a price changes. Messages can also be sent regarding important changes to the system in general. Furthermore, this module contains the ability to turn messages off for the entire system, individual users, groups, access points, and/or remote systems. The notification and messaging system is also integrated within other modules.

Figure 14:
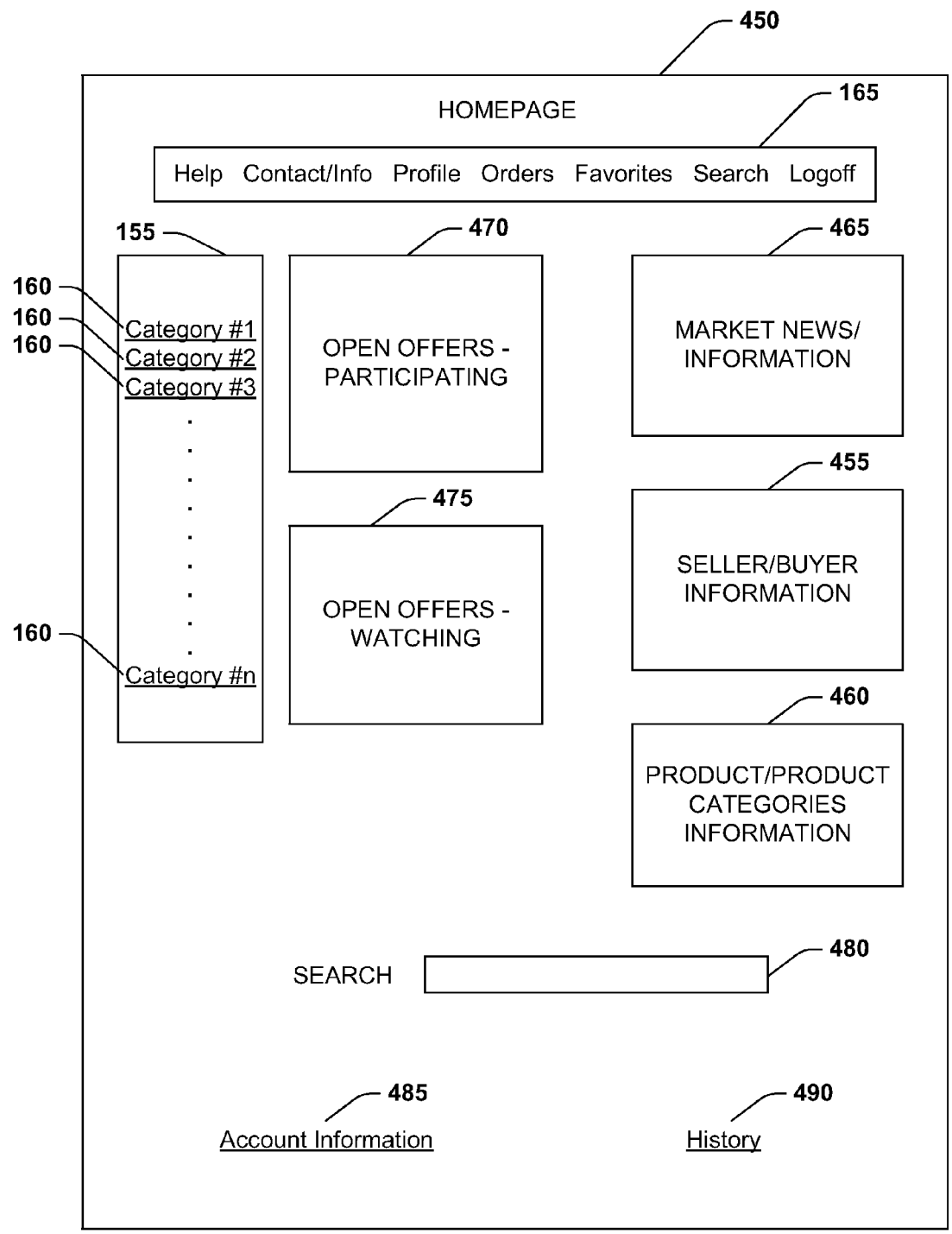
FIG. 14 illustrates a web page in which buyers and sellers may customize in accordance with one aspect of the present invention.

Messages can be sent through email, fax, mobile devices, instant messages, bulletin boards, and/or through a user's homepage. An example of a user's homepage 450 is shown in FIG. 14. The page 450 includes a seller section 455 where the user selects what information he would like to see about a seller, for example, total product offerings, product offerings within a specific category, and any open offers. A product categories section 460 can also be included on the web page. Here, a user can see whether any products or product categories that have been added, modified, or deleted in the system. The user's homepage 450 also includes a news section 465 in which the user can view news headlines and/or market conditions in any specified industries. This section can also inform the user about what has changed on the system since the user was last logged on. For example, the user can see any new buyers and/or sellers that have joined the system, any new offers that have been opened in his area of interest, and any changes that have occurred in the user's own open offers. The homepage 450 can be configured to allow the user to monitor all open offers in which he/she is participating 470 and/or all open offers in which he/she has selected to watch 475. The web page also contains a search field 480, which enables the user to search the system for information, such as a particular seller, buyer, product, or offer. For example, a buyer can search for all open offers which meet the buyer's criteria. The results can be arranged in order of cost, shipping date, offer close date, etc. A hyperlink 485 is provided to the user's account information page (not shown). The account information page allows the user to view and/or modify passwords, shipping and billing addresses, methods of payment, etc. Another hyperlink 490 is provided to the user's history page (not shown). Here the user can view all past orders, RFQs, RFOs, RFPs, etc. It is to be appreciated that this is just one example of a homepage and that many variations can exist since each homepage is customized to provide information relevant to the particular user.

The terms and conditions module handles the entry, storage, and acceptance of system-wide, access point sponsor, and seller terms and conditions. Terms and conditions can be created by using a system template or through free text entry; and relate to the terms governing the sale of the product according to which both the buyer and seller are willing to conduct business. System-wide terms and conditions are those that apply to, and must be accepted by, all users and groups participating in the system. It is possible to have one set, more than one set, or no sets of active system-wide terms and conditions. Access point sponsors can require users of their access points to agree to one or more set of terms and conditions. Sellers can require buyers, which wish to purchase from them, to accept certain terms and conditions. Sellers can have different sets of terms and conditions for different buyers. For example, a seller can have stricter set of terms and conditions for first time buyers than for those which the seller has maintained a long relationship. Likewise, any other user requiring another user to accept certain terms and conditions can tailor the terms and conditions to apply to that particular user. Moreover, buyers can also require seller to accept the buyer's terms and conditions prior to purchasing. The terms and conditions agreed to between parties are stored in the system and can be modified as necessary.

The blanket pricing module allows a seller to provide discount pricing to individual buyers and/or groups of buyers for one or more items. The system always defaults to the lowest price available to a buyer when determining the final order cost. Thus, although buyers can have multiple blanket prices for a particular product, the lowest price will always take precedence. For example, a 15% discount can yield a lower overall cost than a $5 off discount in a particular order. Blanket pricing can be indefinite, dynamic, or fixed. Indefinite blanket pricing is in effect immediately after it is entered or beginning at a specified start date and will affect all future orders until the blanket price is manually revoked. A pricing sheet or equation is employed for dynamic blanket pricing. Here, the price can increase or decrease depending upon the buyers purchasing activities. Dynamic blanket pricing can apply to one product or an entire family of products. Fixed blanket pricing gives sellers the option of setting a start date and end date for which the blanket price is effective. Alternatively, the blanket price can only be effective for a specified quantity of products.

Blanket prices can be specified as a percentage or as a specified dollar amount to be discounted from the final price. Sellers can also use stepped blanket pricing. This allows the sellers to provide the buyers with a pricing sheet that details changes in the blanket prices with order quantity and/or time. The system has the ability to recommend pricing strategies for sellers to construct better blanket pricing. These strategies include calculation routines that use a maximum discount percentage, or fixed cost, to create a step structure such that when the buyer has purchased the required amount, the average price per unit is at the desired level. For example, a seller could offer a blanket price of $15/unit with a commitment of 5000 units. Rather than assuming that the purchasing commitment will be met, the seller could structure the pricing as $20 for the first 2000 units, $18 for the next 1000 units, and finally, $8.50 for the remaining 2000 units. Thus, if the buyer purchases the entire lot, the average price of $15/unit is attained; otherwise the buyer simply receives a tiered discount.

The system recognizes relationships between products. A manufacturer can identify a bill of materials for a product and configure the system so that an order for a product will, in turn, trigger orders for all of the product's component parts. Alternatively, the system can present order recommendations or place RFOs or RFQs instead of actually placing the order. Byproduct relationships are also recognized by the system. Here, the system automatically creates or suggests a byproducts offer when the primary product is ordered. For example, if an order for brass fittings is placed, the system will put out an offer for brass scrap metal produced by the machining process. As more orders are placed, the offer quantity increases. Furthermore, the system can recognize when two different products produce the same byproduct. For example, if an order for brass valves is placed, instead of creating a new offer for brass scrap metal, the system will increase the quantity of the brass scrap metal offer that has already been placed as a result of the order for brass fittings.

The system also recognizes products that share certain features and/or characteristics. Thus, when opening an offer for a particular product, a seller can be alerted of the manufacturing efficiencies available if he also opens an offer for other family members of that product. These manufacturing efficiencies can be based upon decreases in machine change over time when switching from one product to another, decreases in tooling and/or raw material cost, and/or increases in operator efficiencies. Also, products and/or product families can be shared between one or more sellers. The sellers could be two distributors of the same product, a manufacturer and a distributor of the same product, two manufacturers of the same product and/or one of the aforementioned combinations of related products that can be readily substituted. Thus, if one seller does not have the capacity for a buyer's requirements, the system can suggest or automatically split the buyer's order quantity among the different sellers.

Aggregation of shipping costs can be achieved with the logistics module. Thus, on an open offer, buyers can receive the benefits of product aggregation, as well as the benefits of shipping aggregation. Buyers and sellers can choose to share shipping costs with those who share single departure and arrival points and/or with those who share a common truck route. Truck filling based aggregation uses the truck dimensions to fill the truck to a specified percentage capacity. A pricing sheet, or pricing equation, will be used to determine the savings as different capacity levels are achieved. Moreover, the system can determine whether any buyers or sellers within a specified area are having product shipped on the same day. Such area-based truck sharing supports both multiple load and delivery points. The system can further divide the shipping area into zip codes. Rules are then used to determine how to best fit the items on the trucks. Furthermore, custom truck routes can be created by the system in order to achieve the most efficient shipping schedule, which, in turn, leads to significant cost benefits. For example, a preliminary route is provided with list of intervening zip codes. The system then searches for orders that can be picked up or delivered using that route. The system can also modify the route based on other orders as long as the modified route will not detrimentally affect the overall shipping schedule. This module can be integrated with shipping companies and can, alternatively, be available as a separate service.

The RFQ and RFO functions are designed to drive orders towards aggregation whenever possible. A buyer user, agent, or process initiates a RFQ and/or a RFO to predetermined sellers or all sellers of a particular product, specifying an existing product or a description of what is desired. If a specific product is requested by the buyer through a RFQ and/or RFO to a seller, other than the seller of the specified product, that seller will only receive a general description of the product. The RFQ and/or RFO can also include other buyer requirements, such as, quantity, cost range, delivery date or date range, and/or one or more delivery points. Upon receiving the RFQ and/or RFO the seller can accept the request and reply with a corresponding quote and/or offer, or the seller can reject the request. If the request is rejected, the seller has the option of notifying the buyer which requirements the seller was not able to meet, and further, make reasonable counter-offers to the buyer. Thus, the buyer and seller have the opportunity of negotiating for a successful transaction. As an alternative to a RFQ, the buyer can employ a quote generator to view various offer and option choices. The quote generator can return the same information as a formal RFQ but may not be binding upon a seller unless that seller confirms the quote.

An RFP allows a buyer user, agent, or process to request product from one or more sellers. The request can be for a one-time offering of the particular product or can be for a regular listing of the product. The RFP can detail which characteristics of the product the buyer is interested in, which can lead to a seller suggesting a similar product that the seller currently offers through the system. The RFP can also detail information such as, how often the buyer needs the product, in what quantities, what price range, whether any options are desired, and the next need date.

The invoicing module is utilized to store and update account information, create transaction summaries and invoices, and to process account status-dependant queries, such as those necessary for account spending limits. System-to-party invoices, such as transactions fees and recurring fees (e.g., the monthly hosting cost), can be automatically created through this module. The transaction fees are structured as per-transaction fees, fixed percentage fees, or variable fees. The per-transaction fee is set so that a user is charged a predetermined fee for each transaction, regardless of the total order cost. The fixed percentage fee is based on the total order cost for each transaction. The variable fee employs a pricing sheet to specify different transaction fees at different order volumes. These fees can be applied against a seller, a buyer, or both. Recurring fees are initialized to charge a user a predetermined amount and a regular frequency. The ability to set fee start dates, end dates, and waivers are also provided by the system.

The invoicing module also manages system-to-system invoicing and party-to-party invoicing. System-to-system invoicing allows the system to notify integration partners of the amounts that they or those who access the system through them owe. Party-to-party invoicing allows sellers and buyers to manage their account online, including account spending limits. If a buyer places an order, or any other fee-required transaction, and does not maintain an account with the system or the transaction exceeds the buyers spending limit, the buyer will be prompted to pay for the transaction through a credit card, electronic check, or other immediate-approved method. If such payment cannot be secured, the transaction will be cancelled. An account can be charged over-limit fees, late fees, interest, etc. at the discretion of the account lender. The invoicing module also provides interfaces for the system users to make payments and the account lenders to post payment receipts.

The agents module employs historical data and user input data to create and/or suggest various functions to buyers and sellers. Buyers and sellers can create customized agents based on their particular needs or use system default agents. Furthermore, agents can be turned on and off individually or as a group. A seller agent assists a seller maximize production efficiencies. The seller agent system uses information from the seller's previous offers and orders, such as the total capacity of product that went unpurchased for each open offer, to determine a price curve that is most likely to maximize profits for the seller. This agent also recommends the amount of time the seller should leave his offer open, the quantities the seller should offer, what options the seller should offer, the option costs, the shipping increments, and any other information necessary to allow for the greatest efficiencies and profits. Moreover, the seller can receive recommendations on which products should be offered as an aggregate offer and which products should be offered as a single offer. Offers can be automatically created for a seller on a regularly scheduled basis or alternatively, the seller agent can use the seller's inventory levels, forecast information, and open orders to determine when the next offer should be created. The seller can require that the offer be marked for review and manual activation; or the seller can allow the agent to create and activate the order without intervention.

The agent can also look at and make suggestions based on buying trends for a particular product. For example, the agent recognizes that one particular buyer always buys a product when it falls below a certain price. The agent can then recommend to the seller that the seller enter into a NTE contract price with that buyer, thus increasing the likelihood of more orders from that buyer. Furthermore, the system can track each time a buyer reviews a particular product and recommend a pricing strategy for the buyer with respect to that product. For example, a buyer reviews the price of a product at price m, price n, and price o, and places an order at price o. This information is stored whenever the buyer returns and looks at the product. Over time, the system will calculate every price the buyer ignored and accepted, and determine a customized curve for that buyer. The seller can instruct the system to reflect price increase a certain amount above the usually ordered price, or lock in a price at that point as well, creating a contract price variation in real time. As an additional example, the system recognizes that a buyer reviews a particular product three times without placing an order. The system, then, offers a coupon and/or discount to the buyer based upon such traffic patterns and products viewed in order to entice the buyer to purchase.

The seller agent can also be employed to analyze any open deal room activities. The seller can see the number of buyers that have entered the deal room and of those buyers, how many have actually placed an order. Thus, the seller agent can suggest how the seller can modify aspects of an open deal room in response to buyer activity. The seller can choose to close the deal room early, modify the available capacity, open a new deal room for the same product at a different pricing structure, or any other modification which allows the seller to best allocate his fixed resources. Seller agents can also display the seller's relative market share versus their competition with respect to a particular category, subcategory, or product in real time. Thus, the seller can choose to modify one or more open offers in order to increase his market share percentage.

Moreover, the seller agent can be used to suggest and/or create the seller's production and/or manufacturing schedule. The agent will take into consideration historical set-up times between different products (for example, how long it takes to change over a machine when switching from product A to product B as opposed to switching from product A to product C), run efficiencies associated with each machine, percent scrap associated with each machine, percent downtime for a machine, scheduled maintenance times, operator efficiencies, and any other applicable data, to determine which machines the products should run on and in what order. The agent can also recommend the best machine operator for the job and on which shifts the job should run. Moreover, the agent can use the seller's historical data and MRP information to forecast the seller's manufacturing plan by balancing anticipated demand with available capacity.

The seller agent is also capable of interacting with a buyer. Upon request from a buyer, the agent can create blanket prices, new aggregate offers, new single offers, add an order to existing offers, and/or reply to RFQs, RFOs, and RFPs. The goal of the agent is still to achieve the highest profit margin and manufacturing efficiencies for the seller. If the buyer terms and the seller terms are conflicting, the details will be forwarded to the seller for manual review and/or inform the buyer that the terms cannot be accepted. Shipping costs, carrying costs, transaction fees, and any other fees related to an offer and/or order are considered by the seller agent. Rewards and/or penalties are created based on time, the number of buyers on an offer to date, the quantity of product sold, the current price, and the number of cancellations, if any. The rewards can be in the form of a percent discount, flat discount, or bonus items. Penalties can be in the form of a percent markup, flat markup, or one time charge, and can be automatically given to any buyer that cancels an order or reduces the order quantity.

A buyer agent considers the needs of a buyer and assists in finding the best buy for a particular product. This agent looks at previous offer and order history for all sellers or specified sellers of a product and considers past offer percent aggregation, final price achieved, carrying cost vs. aggregation savings, transaction fees, any discounts that can be applied to a particular seller, and any other applicable factor to make a suggestion as to how and where the buyer should place an order. Current market information is also taken into consideration. Thus, the agent provides a comparison between the fair market value for a product and a reasonably anticipated price that can be achieved through the aggregation system.

Similar to the seller agent, the buyer agent interacts with sellers to create an aggregate order, a single order, a RFQ, a RFO, and/or a RFP. The agent can automatically place an order or provide a suggested order to the buyer and wait for manual interaction. The buyer can set up an automated process to place recurring orders, specifying maximum costs, quantity, required receipt dates, etc. The agent can also be configured to automatically place an order when the inventory level of a buyer falls below a predetermined level. Furthermore, the agent has the ability to analyze the buyer's production schedule and determine which products are needed and when in order to achieve the best buying opportunities. Shipping costs, carrying costs, lot sizes, seller quality, potential benefits of ordering early as opposed to waiting, and any other factor important in the buyer's decision making process are also considered by the buyer agent. The seller and buyer agents described above can perform the same functions with respect to a group of sellers or a group of buyers.

Agents are also used to assist the system host or administrator. An association agent is employed to analyze buyer behavior, including searches performed, orders placed, RFOs, RFQs, RFPs, and other similar actions to improve the product category structure. The association agent also generates aggregate sales information for deal rooms, categories, subcategories, products, etc. A content processing agent provides methods that intelligently associates content with products, categories, offers, and/or access points. This agent analyzes data on buyer and seller demographics, previous purchases, and other user behavior, as described above. A publisher/portal agent interfaces with the content processing agent and either suggests or automatically processes the addition and/or removal of content on the system.

All system users can make use of an exchange agent as it is concerned with activities such as, automation of billing, payment posting, and registration. This agent is also capable of overseeing the entire exchange process to identify any problem areas or system errors. For example, the exchange agent monitors deal room activities and if any manual intervention is necessary to troubleshoot the deal room, the exchange agent alerts the system administrator, host or deal room creator.

Although many aspect of the present invention have been largely described within the context of buying and selling goods; it is to be appreciated that buyers and sellers can sponsor deal rooms/transactions to aggregate selling of and purchasing of services, such as broadband, data storage, cell phones, electricity, gas, training programs, etc. For example, a service provider can contract with a group of buyers over a period of time to realize cost efficiencies tied to their usage and/or consumption. A pricing structure can be based upon time (seconds, days, months, years, etc.) and/or the quantity of usage and/or consumption over the specified time period and will be displayed in a deal room, similar to the examples above. A buyer can then visit the deal room at any point in time to track usage and/or consumption and also, view the current price, or billing schedule in real time. The buyer can view his/her individual usage and/or consumption, as well as, the usage and/or consumption of the entire buying group for that particular service. Furthermore, as above, the curves can vary for different buyers, based upon items such as rebate schedules, discounts, amount of usage and/or consumption, and length of contract between the buyer and the seller.

The system, as described above, is functional internationally. Thus, conversions are provided by the system for language, currency, units of measure, time and date, etc. in order to comply with a particular region's standard. Users can have the option of choosing which standards they prefer when registering with the system.

Figure 15:
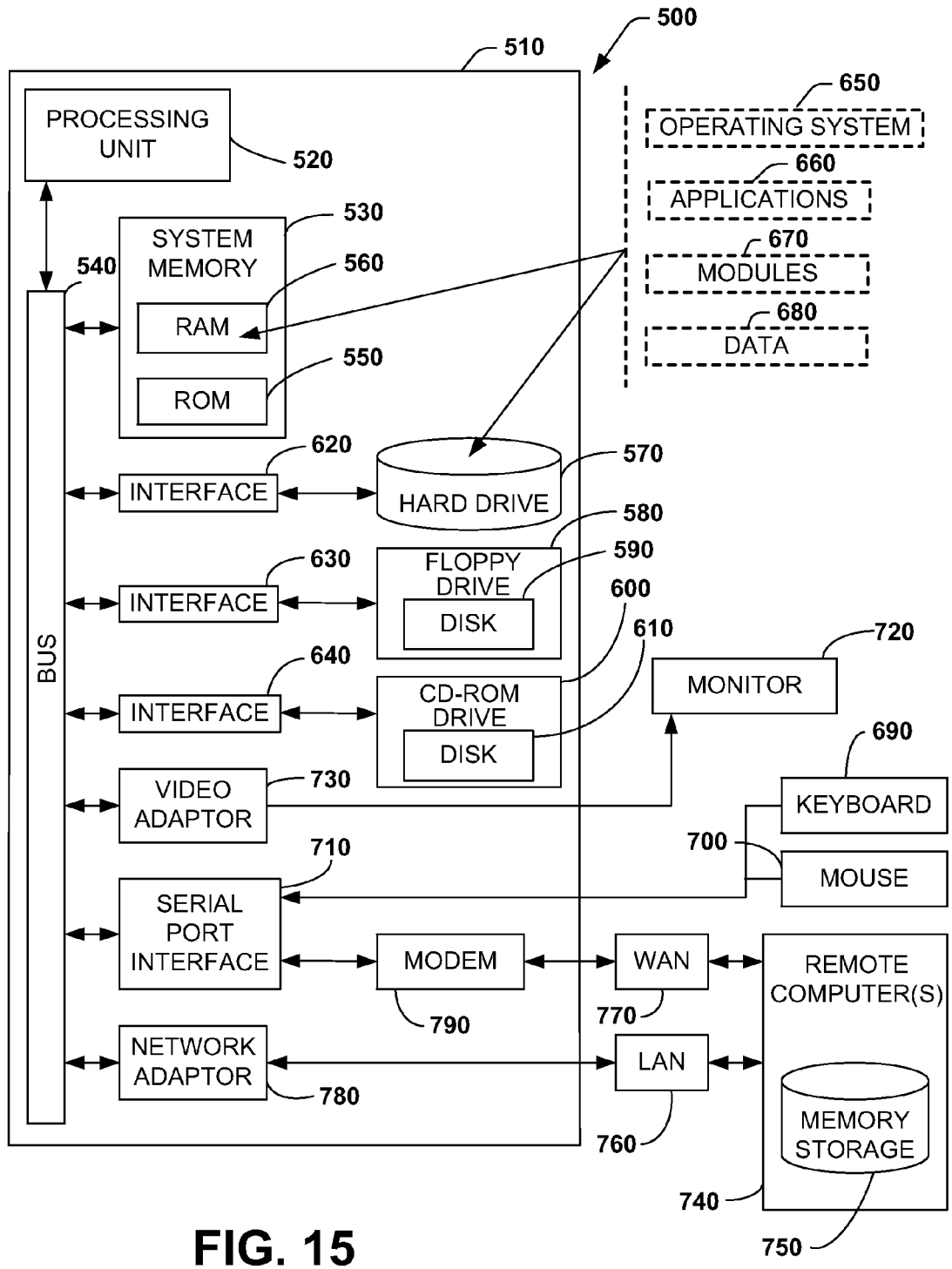
FIG. 15 illustrates a block diagram of a central server in accordance with one aspect of the present invention.

With reference to FIG. 15, an exemplary system 500 for implementing the invention includes a conventional personal or server computer 510, including a processing unit 520, a system memory 530, and a system bus 540 that couples various system components including the system memory 530 to the processing unit 520. The processing unit 520 can be any of various commercially available processors. Dual microprocessors and other multi-processor architectures also can be used as the processing unit 520.

The system bus 540 can be any of several types of bus structure including a memory bus or memory controller, a peripheral bus, and a local bus using any of a variety of commercially available bus architectures. The system memory includes read only memory (ROM) 550 and random access memory (RAM) 560. A basic input/output system (BIOS), containing the basic routines that help to transfer information between elements within the computer 510, such as during start-up, is stored in ROM 550. The computer 510 further includes a hard disk drive 570, a magnetic disk drive 580, e.g., to read from or write to a removable disk 590, and an optical disk drive 600, e.g., for reading a CD-ROM disk 610 or to read from or write to other optical media. The hard disk drive 570, magnetic disk drive 580, and optical disk drive 600 are connected to the system bus 540 by a hard disk drive interface 620, a magnetic disk drive interface 630, and an optical drive interface 640, respectively. The drives and their associated computer-readable media provide nonvolatile storage of data, data structures, computer-executable instructions, etc. for the server computer 510. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment. A number of program modules can be stored in the drives and RAM 560, including an operating system 650, one or more application programs 660, other program modules 670, and program data 680.

A user interface provides an interface through which the central server 25 can be directly programmed or accessed. The user interface can, for example, be an alphanumeric keyboard 690 and mouse 700. Other input devices (not shown) can include a microphone, joystick, game pad, satellite dish, scanner, or the like. These and other input devices are often connected to the processing unit 520 through a serial port interface 710 that is coupled to the system bus 540, but can be connected by other interfaces (not shown), such as a parallel port, game port or a universal serial bus (USB). A monitor 720 or other type of display device is also connected to the system bus 540 via an interface, such as a video adapter 730. In addition to the monitor 720, computers typically include other peripheral output devices (not shown), such as speakers and printers.

The computer 510 can operate in a networked environment using logical connections to one or more remote computers, such as a remote server or client computer 740. The remote computer 740 can be a workstation, a server computer, a router, a peer device or other common network node, and typically includes many or all of the elements described relative to the computer 510, although only a memory storage device 750 has been illustrated in FIG. 15. The logical connections depicted in FIG. 15 include a local area network (LAN) 760 and a wide area network (WAN) 770. Such networking environments are commonplace in offices, enterprise-wide computer networks, intranets and the Internet.

When used in a LAN networking environment, the computer 510 is connected to the local network 760 through a network interface or adapter 780. When used in a WAN networking environment, the server computer 520 typically includes a modem 790, or is connected to a communications server on the LAN 760, or has other means for establishing communications over the wide area network 770, such as the Internet. The modem 790, which can be internal or external, is connected to the system bus 540 via the serial port interface 710. In a networked environment, program modules 670 depicted relative to the computer 510, or portions thereof, can be stored in the remote memory storage device 750. It will be appreciated that the network connections shown are exemplary and other means of establishing a communications link between the computers can be used.

The present invention may be implemented via object oriented programming techniques. In this case each component of the system, could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The present invention can employ abstract classes, which are designs of sets of objects that collaborate to carry out a set of responsibilities. Frameworks are essentially groups of interconnected objects and classes that provide a prefabricated structure for a working application. It should also be appreciated that the PCM and the shared memory components could be implemented utilizing hardware and/or software, and all such variations are intended to fall within the appended claims included herein.

According to an exemplary aspect of the present invention, Java and CORBA (Common Object Request Broker Architecture) are employed to carry out the present invention. Java is an object-oriented, distributed, secure, architecture neutral language. Java provides for object-oriented design, which facilitates the clean definition of interfaces and makes it possible to provide reusable "software ICs." Java has an extensive library of routines for copying easily with TCP/IP protocols like HTTP and FTP. Java applications can open and access objects across a network via URLs with the same ease to which programmers are accustomed to accessing a local file system.

Furthermore, Java utilizes "references" in place of a pointer model and so eliminates the possibility of overwriting memory and corrupting data. Instead of pointer arithmetic that is employed in many conventional systems, the Java "virtual machine" mediates access to Java objects (attributes and methods) in a type-safe way. In addition, it is not possible to turn an arbitrary integer into a reference by casting (as would be the case in C and C++ programs). In so doing, Java enables the construction of virus-free, tamper-free systems. The changes to the semantics of references make it virtually impossible for applications to forge access to data structures or to access private data in objects that they do not have access to. As a result, most activities of viruses are precluded from corrupting a Java system.

Java affords for the support of applications on networks. Networks are composed of a variety of systems with a variety of CPU and operating system architectures. To enable a Java application to execute anywhere on the network, a compiler generates an architecture neutral object file format—the compiled code is executable on many processors, given the presence of the Java runtime system. Thus, Java is useful not only for networks but also for single system software distribution. In the present personal computer market, application writers have to produce versions of their applications that are compatible with the IBM PC and with the Apple Macintosh. However, with Java, the same version of the application runs on all platforms. The Java compiler accomplishes this by generating byte code instructions that have nothing to do with particular computer architecture. Rather, they are designed to be both easy to interpret on any machine and easily translated into native machine code on the fly.

Being architecture neutral, the "implementation dependent" aspects of the system are reduced or eliminated. The Java virtual machine (VM) can execute Java byte codes directly on any machine to which the VM has been ported. Since linking is a more incremental and lightweight process, the development process can be much more rapid and exploratory. As part of the byte code stream, more compile-time information is carried over and available at runtime.

Thus, the use of Java in the present invention provides a server to send programs over the network as easily as traditional servers send data. These programs can display and manipulate data on a client computer. The present invention through the use of Java supports execution on multiple platforms. That is the same programs can be run on substantially all computers—the same Java program can work on a Macintosh, a Windows machine, a Sun workstation, etc. To effect such multi-platform support, a network interface and a network browser (not shown) such as Netscape Navigator or Microsoft Internet Explorer may be used in at least one aspect of the present invention. It should be appreciated, however, that a Java stand-alone application might be constructed to achieve a substantially equivalent result. Although the present invention is described with respect to employing Java, it will be appreciated that any suitable programming language may be employed to carry out the present invention.

An Internet browser (e.g., Netscape, Microsoft Internet Explorer) is held within the memory of the client computer. The Internet Explorer enables a user to explore the Internet and view documents from the Internet. The Internet Explorer may include client programs for protocol handlers for different Internet protocols (e.g., HTTP, FTP and Gopher) to facilitate browsing using different protocols.

It is to be appreciated that any programming methodology and/or computer architecture suitable for carrying out the present invention may be employed and are intended to fall within the scope of the hereto appended claims.

Although the invention has been shown and described with respect to a certain preferred aspect or aspects, equivalent alterations and modifications will occur to others skilled in the art upon reading and understanding this specification and the annexed drawings. In particular regard to the various functions performed by the above described components (systems, assemblies, systems, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary aspect or aspects of the invention. In addition, while a particular feature of the invention may have been described above with respect to only one of several aspects, such feature may be combined with one or more other features of the other aspects, as may be desired and advantageous for any given or particular application. Furthermore, to the extent that the term "includes" is used in either the detailed description or the claims, such term is intended to be inclusive in a manner similar to the term "comprising".

What is claimed is:

1. A non-transitory computer readable storage medium having embodied thereon instructions executable by a processor to perform a method for order aggregation and merchant ranking, the method comprising:

receiving a deal provided by a merchant of a product or service, wherein the deal includes a discounted price that becomes valid only when a predetermined number of buyers purchase or indicate a desire to purchase the deal;

posting the deal and terms and conditions associated with the deal to a publically accessible web site, acceptance of the terms and conditions being a condition of purchasing the deal;

receiving orders for the product or service from registered prospective customers who have provided a verified method of payment in connection with an associated order for the product or service;

aggregating the orders from confirmed customers until a specified end time, wherein the confirmed customers are a subset of the registered prospective customers having provided both a verified method of payment and an interest to purchase the deal;

presenting a lower discounted price for the same deal to at least one registered buyer by way of a private account;

comparing a current order volume to the minimum order volume to determine that the deal has become valid;

accepting the orders for the product or service received from the confirmed customers at the two or more discounted prices; and presenting a ranking associated with the merchant for the product or service.

2. The non-transitory computer readable storage medium of claim 1, further comprising instructions executable by a processor to match at least one customer to future deals.

3. The non-transitory computer readable storage medium of claim 1, further comprising instructions executable by a processor to update the ranking in response to feedback provided by a customer.

4. The non-transitory computer readable storage medium of claim 3, further comprising instructions executable by a processor to provide a questionnaire in order to solicit the feedback.

5. The non-transitory computer readable storage medium of claim 1, further comprising instructions executable by a processor to manage a points program in which redeemable points are provided to an account associated with a customer from the registered prospective customers as a function of activity of the customer.

6. The non-transitory computer readable storage medium of claim 5, wherein the activity of the customer relates to being one of the first among the registered prospective customers to submit an order for the product or service.

7. The non-transitory computer readable storage medium of claim 5, wherein the activity of the customer relates to ordering more than one of the product or service.

8. The non-transitory computer readable storage medium of claim 5, wherein the redeemable points are redeemable for an extra discount for the product or service in addition to the discounted price.

9. The non-transitory computer readable storage medium of claim 5, wherein the redeemable points are redeemable for cash.

10. The non-transitory computer readable storage medium of claim 5, wherein the redeemable points are redeemable for a discount on a different product or service.

11. The non-transitory computer readable storage medium of claim 5, further comprising instructions executable by a processor to award the redeemable points only in the event the discounted price is valid.

12. The non-transitory computer readable storage medium of claim 1, further comprising instructions executable by a processor to maintain a profile associated with at least one registered prospective customer, wherein the profile is populated with the information collected relating to the at least one customer.

13. The non-transitory computer readable storage medium of claim 12, further comprising instructions executable by a processor to manage access to the profile.

14. The non-transitory computer readable storage medium of claim 12, further comprising instructions executable by a processor to receive at least a portion of the information from a third party resource.

15. The non-transitory computer readable storage medium of claim 12, further comprising instructions executable by a processor to examine the information to infer a preference of the customer.

16. The non-transitory computer readable storage medium of claim 15, further comprising instructions executable by a processor to group the customer with other customers with at least one similar preference.

17. The non-transitory computer readable storage medium of claim 12, further comprising instructions executable by a processor to examine the information to infer a dislike of the customer, where the dislike relates to an inference of what the customer does not prefer.

18. The non-transitory computer readable storage medium of claim 17, further comprising instructions executable by a processor to advertise total purchasing power as orders for the deal are received.

19. The non-transitory computer readable storage medium of claim 17, further comprising instructions executable by a processor to accept orders after the discounted price is valid as a function of availability and time of receipt of the orders.

20. A method, comprising:
receiving a deal from a merchant of a product or service, the deal including a discounted price for the product or service that is valid only when a minimum order volume for the product or service is received before a specified end time, the deal received via a communications interface communicatively coupled to a communications network;
presenting the deal and a set of terms and conditions associated with the deal to a publically accessible web site;
receiving orders for the product or service in connection with the deal from a set of registered prospective customers who have provided a verified method of payment in connection with an associated order for the product or service, the orders received via the communications network by way of the communications interface;
aggregating the orders from a set of confirmed customers until the specified end time, wherein the set of confirmed customers is a subset of the set of registered prospective customers and have provided a verified method of payment and having agreed to the set of terms and conditions;
presenting a lower discounted price for the same deal to at least one registered buyer by way of a private account;
comparing a current order volume to the minimum order volume for determining whether the discounted price is valid;
accepting the orders for the product or service at the discounted price when the minimum order volume for the product or service is received before the specified end time; and
storing information relating to at least one customer from the set of registered prospective customers in order to compute a ranking associated with the merchant.

21. The method of claim 20, further comprising matching at least one customer to a particular deal.

22. The method of claim 20, further comprising updating the ranking in response to feedback provided by a confirmed customer.

23. The method of claim 22, further comprising providing a questionnaire to the confirmed customer in order to solicit the feedback.

24. The method of claim 20, further comprising managing a points program in which redeemable points are provided to an account associated with a customer from the set of registered prospective customers as a function of activity of the customer.

25. The method of claim 24, wherein the activity of the customer relates to being one of the first to submit an order for the product or service.

26. The method of claim 24, wherein the redeemable points are provided to the account when the discounted price becomes valid.

27. The method of claim 20, further comprising maintaining a profile associated with at least one registered prospective customer, wherein the profile is populated with the information relating to the at least one customer.

28. A non-transitory computer readable storage medium having embodied thereon instructions executable by a processor to:
receive an offer from a merchant of a product or service, wherein the offer includes at least a discounted price that becomes valid only when a minimum number of the product or service are purchased within a specified period of time;
present the offer and at least a portion of terms and conditions associated with the offer to a publically accessible web site, wherein the portion of the terms and conditions includes at least an indication of the minimum number that must be purchased prior to the specified period of time in order to validate the discounted price;

receive at least one order for the product or service from registered prospective customers;

verify a method of payment provided by the registered prospective customers in connection with an associated order for the product or service;

aggregate orders received from confirmed customers until the specified period of time expires, wherein the confirmed customers are a subset of the registered prospective customers who have agreed to the terms and conditions;

presenting a lower discounted price for the same deal to at least one registered buyer by way of a private account;

compare a current order volume to the minimum number to determine whether the discounted price is valid;

accept the orders for the product or service at the discounted price when the discounted price is valid; and collect information relating to at least one customer from the registered prospective customers in order to determine a ranking associated with the merchant.

29. The non-transitory computer readable storage medium of claim 28, further comprising instructions executable by a processor to match at least one customer to future offers.

30. The non-transitory computer readable storage medium of claim 28, further comprising instructions executable by a processor to manage a points program in which redeemable points are provided to an account associated with one of the registered prospective customers as a function of activity of the registered prospective customer.

31. The non-transitory computer readable storage medium of claim 30, wherein the activity of the registered prospective customer relates to being one of the first among the registered prospective customers to submit an order for the product or service.

32. The non-transitory computer readable storage medium of claim 30, further comprising instructions executable by a processor to award the redeemable points only in the event the minimum number is met.

* * * * *